(12) United States Patent
Ogino et al.

(10) Patent No.: US 6,535,213 B1
(45) Date of Patent: Mar. 18, 2003

(54) CURVE EDITION SYSTEM, CURVE-LOOP DETECTING SYSTEM, CURVE-LOOP REMOVING SYSTEM

(75) Inventors: Tomotaka Ogino, Tokyo (JP); Makoto Kawamura, Tokyo (JP); Takashi Totsuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/398,866

(22) Filed: Sep. 20, 1999

(30) Foreign Application Priority Data

Sep. 22, 1998 (JP) .......................................... 10-268687
Sep. 22, 1998 (JP) .......................................... 10-268688

(51) Int. Cl.$^7$ ............................. G06T 7/00; G06T 9/00; G06T 11/80; G06T 11/20; H04N 5/275
(52) U.S. Cl. ........................ 345/442; 345/441; 345/468; 345/469; 345/469.1; 382/181; 382/199
(58) Field of Search ................................. 345/440, 441, 345/442, 443, 467, 468, 469, 469.1, 470, 471, 472, 473, 619, 621, 622, 653–655, 472.3, 474; 382/170–171, 177, 181, 185, 193, 199, 201, 202–204, 254; G06T 7/00, 9/00, 11/80, 11/20; H04N 5/2775

(56) References Cited

U.S. PATENT DOCUMENTS 3,987,412 A  * 10/1976 Morrin, II .......... 340/146.3 AE (List continued on next page.)

FOREIGN PATENT DOCUMENTS

| JP | 6-0232787 A | 11/1985 |
|---|---|---|
| JP | 4-340671 A | 11/1992 |
| JP | 5-153493 A | 6/1993 |
| JP | 5-236347 A | 9/1993 |
| JP | 8-331445 A | 12/1996 |
| WO | WO96/36168 A | 11/1996 |

OTHER PUBLICATIONS

Michael E. Hohmeyer, A Surface Intersection Algorithm based on Loop Detection, Sep. 1991, ACM 089791–427, pp. 197–207.*

John D. Hobby, Generating Automatically Turned Bitmaps from Outlines, 1993 ACM 0004–5411/93/0100–0048, pp. 48–94.*

Primary Examiner—Matthew C. Bella
Assistant Examiner—Wesner Sajous
(74) Attorney, Agent, or Firm—Frommer Lawrence & Haug LLP; William S. Frommer; Samuel H. Megerditchian

(57) ABSTRACT

Two curves indicating the border of an object in an image are simply edited and loops formed owing to edition of the curves indicating the border of an object in an image are detected and removed. A curve edition apparatus according to the present invention incorporates: converting units for converting two curves indicating positions of inner and outer boundaries of a border of an object included in an image to produce a dot sequence for each curve; a changing unit for changing the coordinates of each point by linking the dot sequence of each curve produced by the converting units; and restructuring units for restructuring the two curves from the coordinates of each point having the coordinates changed by the changing unit. Another aspect incorporates an edition unit for editing the shape of a boundary curve indicating the shape of a border of an object included in an image and formed by a plurality of segments; a first detecting unit for detecting, for each segment, a loop formed owing to an edition process performed by the edition unit; a second detecting unit for detecting a loop formed by a plurality of segments; and loop removing units for removing the loops detected by the first detecting unit and the second detecting unit.

16 Claims, 23 Drawing Sheets

U.S. PATENT DOCUMENTS

| | | | |
|---|---|---|---|
| 4,124,871 A | * 11/1978 | Morin, II | 358/287 |
| 4,620,287 A | * 10/1986 | Yam | 345/442 |
| 4,674,058 A | * 6/1987 | Lindbloom et al. | 358/518 |
| 4,933,866 A | * 6/1990 | Markoff | 364/518 |
| 5,091,967 A | * 2/1992 | Ohsawa | 382/22 |
| 5,353,396 A | * 10/1994 | Ahlquist, Jr. et al. | 345/442 |
| 5,497,451 A | * 3/1996 | Holmes | 395/120 |
| 5,586,241 A | * 12/1996 | Bauermeister | 395/167 |
| 5,594,855 A | * 1/1997 | VonEhr, II et al. | 345/442 |
| 5,611,036 A | * 3/1997 | Berend et al. | 345/441 |
| 5,742,295 A | * 4/1998 | Lindhlom | 345/437 |
| 6,151,032 A | * 11/2000 | Cheng | 345/469 |
| 6,404,434 B1 | * 6/2002 | Shimada et al. | 345/442 |

* cited by examiner

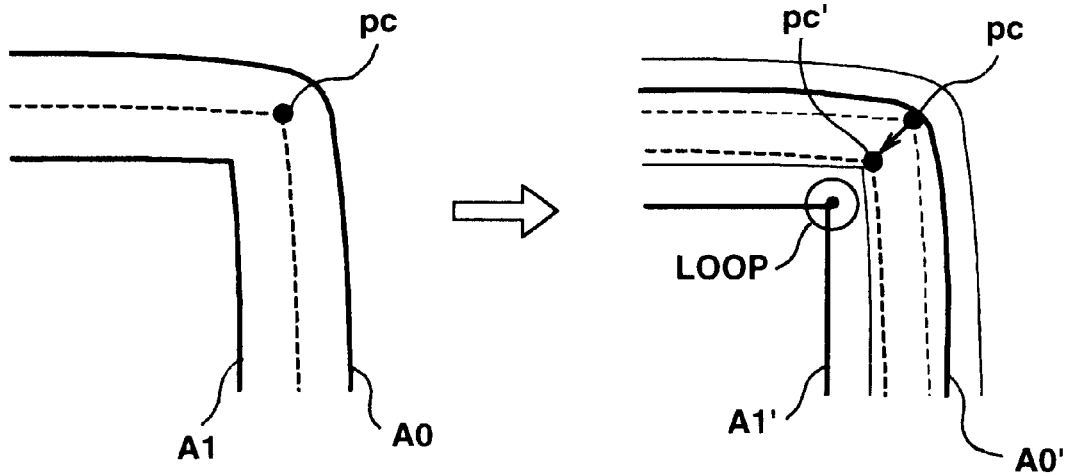
FIG.1A  FIG.1B
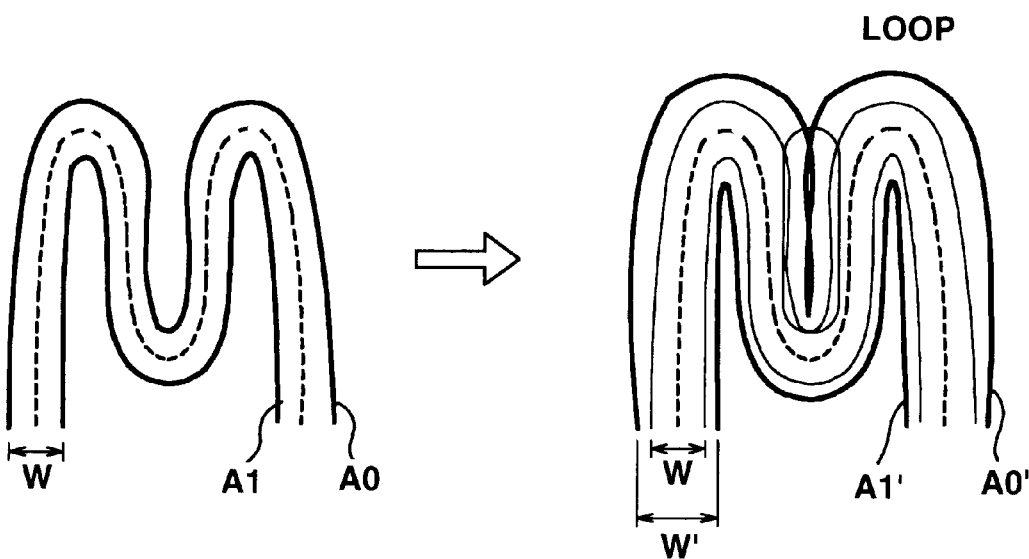
FIG.2A  FIG.2B

REMOVE R1 ⇩

REMOVE R4 ⇩

REMOVE R2 ⇩

CURVE EDITION SYSTEM, CURVE-LOOP DETECTING SYSTEM, CURVE-LOOP REMOVING SYSTEM

BACKGROUND OF THE INVENTION

1. Field of the Invention

The present invention relates to a curve edition system included in an image processing technique which is employed in an industrial field of a CAD and an image producing field and arranged to edit boundary curves indicating a border of an object included in an image, a curve-loop detecting system for detecting a loop formed owing to edition of the boundary curves, a curve-loop removing system for removing a loop formed by the boundary curves.

2. Description of the Related Art

A conventional technique for producing key signals by extracting the border of an object in an image is a basic and important image processing technique which is applied to a variety of fields including recognition of an object and tracking and synthesis of images. The key signal includes a so-called hard key which uses binary codes such that the value of a foreground image is made to be one and value of a background image is made to be zero. Another key signal is a soft key with which the border of an object is constituted by two border curves and the value of the foreground image and the value of the background are gradually changed from zero to one.

The conventional methods of producing the soft keys have a main step that an adequate inclination is provided for a border portion of each hard key. For example, "IMAGE SYNTHESIZING APPARATUS" disclosed in Japanese Patent Laid-Open No. 60-232787 has a step of extracting only the border portions of an object in accordance with the hard keys to smooth the image. Another method of producing soft keys has a step of using signals of hard keys to subject only the border portions of the object to a process using a low-pass filter to blur away the border portions of the object so as to obtain a smooth image.

In Japanese Patent Laid-Open No. 4-340671, "ANTI-ALIASING METHOD" has been disclosed with which image blocks are set around a certain pixel of interest in the border portion of an object so as to produce soft keys in accordance with patterns of pixels in the foreground images and the background images in the pixel blocks. The soft keys produced by each of the foregoing methods cannot usually overcome motion blur which occurs when an object is moving because uniform inclinations are provided for the border portions of the object.

A conventional method for producing soft keys by factoring in the motion blur of a dynamic image has been disclosed in, for example, Japanese Patent Laid-Open No. 5-153493. The foregoing method has the step of making a present image of a dynamic image and an immediately preceding image to a comparison to obtain the total sum of variations of pixels at each position of an object. In accordance with the magnitude of the variation, the width of the soft key is determined. However, the foregoing method does not permit a user to easily change a curved surface because the curved surface of the soft key is not controlled.

A technique of producing soft keys has been disclosed in Japanese Patent Laid-Open No. 5-236347 under the title of "SOFT-KEY PRODUCING APPARATUS". According to the foregoing disclosure, soft keys are produced by performing a process for shaving a hard key with an elliptic cone at each point on the border of an object. The foregoing method is performed such that the motion vector of a portion of interest and the gradient of the image are calculated so as to determine the major axis and the minor axis of the ellipse which is the bottom surface of the elliptic cone. The control of the technique for producing soft keys is performed by using the motion vector and the intensity of the edge to determine the major and minor axes. Hence it follows that the reflection of the motion vector and the intensity of the edge on the produced soft key cannot easily be determined. The foregoing technique for producing soft keys has a step of performing an indirect process for producing soft keys by shaving the hard keys in place of direct production of the soft keys. Therefore, the reflection of the control of the produced soft key cannot easily be determined. As a result, the foregoing technique for producing soft keys does not permit a user to easily perform a required change when the user requires change of a portion of the soft keys.

A conventional technique for producing soft keys has been disclosed in Japanese Patent Laid-Open No. 8-331445 under the title of "APPARATUS FOR PRODUCING SOFT KEY". The foregoing technique for producing soft keys employs curved surfaces to express the border portions. Therefore, the foregoing method is able to correspond to local changes in the widths of the soft keys on the border. A technique for producing soft keys disclosed in Japanese Patent Laid-Open No. 9-37153 under the title of "KEY-SIGNAL CALCULATING APPARATUS AND METHOD THEREFOR" uses changes in the values of pixels to automate calculations of the key signals so as to enable the width of the soft key to be calculated.

The "APPARATUS FOR PRODUCING SOFT KEY" disclosed in Japanese Patent Laid-Open No. 8-331445 and "KEY-SIGNAL CALCULATING APPARATUS AND METHOD THEREFOR" disclosed in Japanese Patent Laid-Open No. 9-37153 have a problem. That is, direct use of the soft key having the width obtained from change in the value of the pixel in a process for synthesizing images results in leakage of the color of the background to the synthesized image. Therefore, edition processes must be performed by a user such that the width of the soft key in the border portion is adjusted and the overall image is moved outwards/inwards.

When a soft key having a width is edited, projection to a flat image display unit is required. When an assumption is made that the mixture ratio of the foreground image and the background image is a, edition is permitted by performing expression using two curves at $\alpha=0$ and $\alpha=1$. That is, the two curves form a shape surrounding the border owing to the characteristic of the key curved surface. Therefore, the two curves have a close relationship with the shape of the border of the object. To maintain consistency of the shape of the key curved surface, intersection of the curves must be prevented.

In an example case in which two border curves A0 and A1 as shown in FIG. 1A are edited to totally and inwards move central line pc' to central line pc' as shown in FIG. 1B and the border curves are A0' and A1', a loop is undesirably formed at the internal border curve A1' of the two border curves A0' and A1'. In another example case in which border curves A0 and A1 shown in FIG. 2A are deformed into border curves A0' and A1' shown in FIG. 2B and the width is changed from W to W', also loop is undesirably formed.

To edit two border curves, a method has usually been employed with which each border curve is edited. That is, a uniform process of the two curves cannot be performed. What is worse, the foregoing method has a problem in that the width of the curve is changed unintentionally for a user owing to no relationship with the direction of the border.

SUMMARY OF THE INVENTION

In view of the foregoing, an object of the present invention is to provide a curve edition system which is capable of easily editing two curves indicating the border of an object in an image.

Another object of the present invention is to provide a curve edition, curve loop detection, and curve loop removing system which is capable of detecting and removing a loop formed owing to edition of a curve representing the border of an object in an image.

To achieve the foregoing objects, according to one aspect of the present invention, there is provided a curve edition apparatus comprising: converting means for converting two curves indicating positions of inner and outer boundaries of a border of an object included in an image to produce a dot sequence for each curve; changing means for changing the coordinates of each point by using the dot sequence of each curve produced by the converting means; and restructuring means for restructuring the two curves from the coordinates of each point having the coordinates changed by the changing means.

The curve edition apparatus structured as described above performs an edition process by changing the coordinates of the dot sequence such that the changing means uses the dot sequences of the curves to change the coordinates, followed by restructuring the two curves from the coordinates of each point having the changed coordinates.

According to another aspect of the present invention, there is provided a curve edition method comprising the steps of: converting two curves indicating positions of inner and outer boundaries of a border of an object included in an image to produce a dot sequence for each curve; changing the coordinates of each point by using the dot sequence of each curve produced by the converting means; and restructuring the two curves from the coordinates of each point having the coordinates changed by the changing means.

The curve edition method according to the present invention is arranged to perform the edition process such that two curves are converted into the dot sequences to change the coordinates of the dot sequences. In this case, the dot sequences for the curves are used to change the coordinates of each point to restructure the two curves from the coordinates of each point having the changed coordinates.

According to another aspect of the present invention, there is provided a curve edition apparatus and a method therefor structured such that the shape of a boundary curve indicating the shape of the border of an object included in an image and formed by a plurality of segments is edited; a loop formed owing to the edition step for each segment is detected for each segment; a loop formed by a plurality of segments is detected: and the detected loop is removed.

The curve edition apparatus and method therefor are arranged such that the loop formed owing to the edition of the boundary curve is removed by detecting a fact that the loop is formed in each segment or a plurality of segments.

According to a curve-loop detecting method and apparatus therefor are structured to determine whether or not a loop is formed by a single segment by forming a boundary curve indicating the border of an object included in an image and by projecting a vector connecting a terminal point and a control point of each segment in the form of a Bezier curve defined by the terminal point and the control point to each other on a straight line so as to detect the direction of the vector; and determine whether or not a loop is formed by a single segment by dividing a segment determined in the rough determining step that the loop is formed by the single-segment and by setting a rectangular region surrounding each segment by connecting a terminal point and a control point of each segment produced owing to the division process to each other so as to determine whether or not the rectangular region are superimposed.

The curve-loop detecting method and apparatus therefor are arranged to perform the precise determination for determining whether or not the loop is formed by a single segment. In accordance with a result of the rough determination, a loop having the possibility that a loop is formed is subjected to the precise determination.

The curve-loop removing method and apparatus therefor according to the present invention are structured to use information about the intersection indicating a fact that a loop is formed because each segment formed by dividing a boundary curve indicating the shape of a border of an object included in an image intersects to extract a plurality of loops made contact with one another at each intersection according to the lengths of the loops, wherein the plurality of loops made contact with one another at the intersection are removed according to the lengths of the loops.

The curve-loop removing method and apparatus therefor are arranged to use information about the intersections to remove a plurality of loops made contact with one another at the intersection according to the lengths of the loops in an ascending order or descending order of the length of the loop.

Other objects, features and advantages of the invention will be evident from the following detailed description of the preferred embodiments described in conjunction with the attached drawings.

BRIEF DESCRIPTION OF THE DRAWINGS

FIG. 1 is a diagram showing formation of a loop owing to deformation of the border curves A0 and A1;

FIG. 2 is a diagram showing formation of a loop owing to deformation of the border curves A0 and A1;

FIG. 34C is a diagram showing a process for secondly removing the loop R4 and FIG. 34D is a diagram showing a process for removing the loop R2 after that.

DETAILED DESCRIPTION OF THE PREFERRED EMBODIMENT

An embodiment of the present invention will now be described with reference to the drawings.

Figure 3:
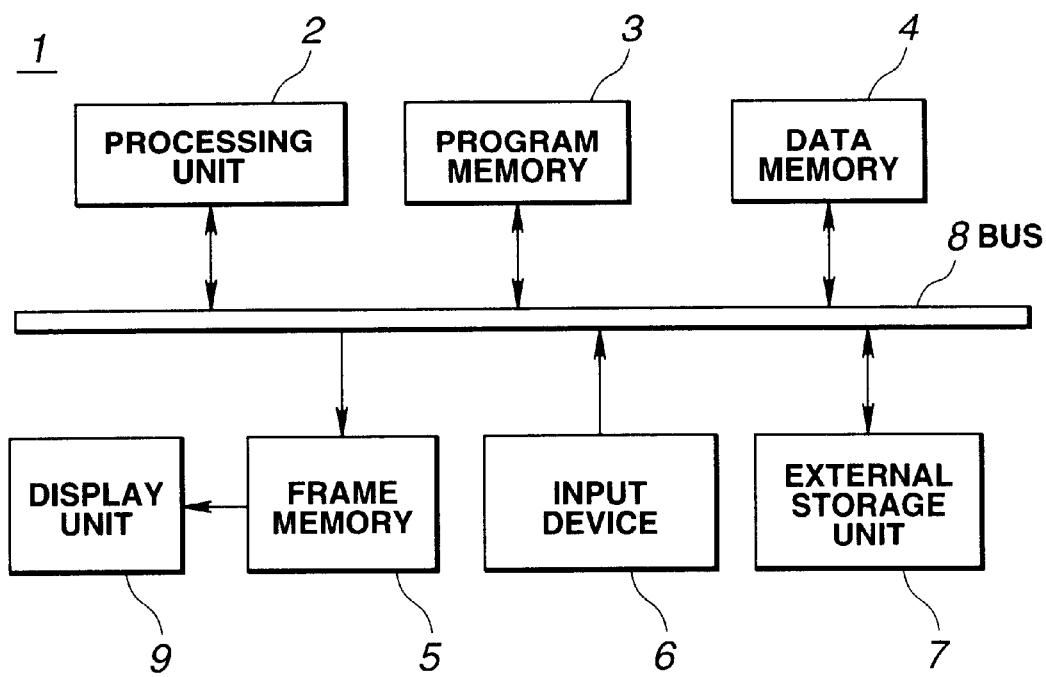
FIG. 3 is a block diagram showing the structure of a curve edition apparatus according to the present invention.

A curve edition apparatus 1 according to the present invention has a structure, for example, as shown in FIG. 3. The curve edition apparatus 1 has a structure that a processing unit 2, a program memory 3, a data memory 4, a frame memory 5, an input device 6 and an external storage unit 7 are connected to a bus 8.

The curve edition apparatus 1 incorporates the input device 6 which comprises a keyboard and a mouse and which generates an operation input signal when operated by a user. The input device 6 outputs, to the processing unit 2, the operation input signal generated owing to an operation performed by the user. In response to the operation input signal supplied from the input device 6, the processing unit 2 generates control signals for controlling the foregoing units. The processing unit 2, which outputs the generated control signals to the foregoing units, performs a process corresponding to the operation input signal. The processing unit 2 receives, from a program memory 3, a program for editing a border curve indicating the border of an object included in each frame by using image data stored in, for example, the external storage unit 7. Note that the processing blocks of the processing unit 2 will be described later.

Figure 4:
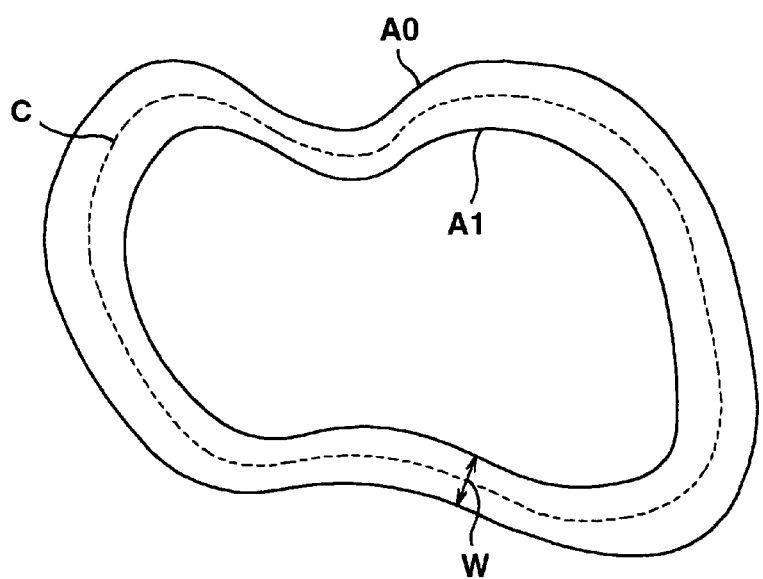
FIG. 4 is a diagram showing border curve A0 and border curve A1.

The boundary curve is composed of two curves which surround a region corresponding to the border of an object included in each frame. The boundary curve is produced in accordance with, for example, the intensity of an edge of an image. The two boundary curves are determined in accordance with a mixture ratio of an object of interest and an image which is the background of the object. When interest is developed in a pixel of a still image including the foreground and the background, the foreground and the background exist in the pixel such that the boundary is interposed between the foreground and the background. The mixture ratio of the foreground in the pixel is expressed from zero to one is called an alpha value. When interest is developed in a pixel of a dynamic image in the boundary of the foreground and the background, no clear boundary exists between the foreground and the background. In this case, the foreground and the background are superimposed. Also the mixture ratio of the foreground of the pixel is expressed with the alpha value. That is, the two border curve, for example, as shown in FIG. 4, consist of a border curve A1 having an alpha value of "1" and a border curve A0 having an alpha value of "0", the two boundary curves being disposed on the two sides of central line C at positions apart from each other for a width W.

Figure 5:
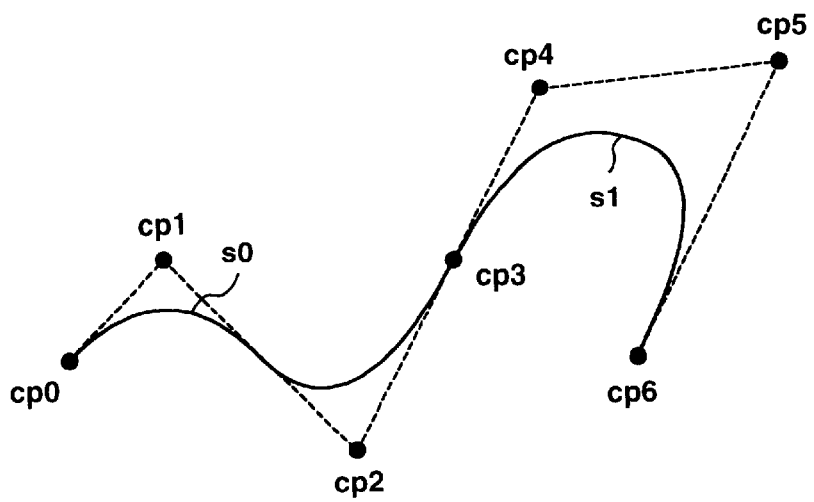
FIG. 5 is a diagram showing a boundary curve which is subjected to an edition process by a processing unit.

As partially shown in FIG. 5, a boundary curve which is subjected to an edition process by the processing unit 2 is composed of a plurality of segments s0 and s1. The segment s0 is composed of a plurality of control points cp0 to cp3 and the segment of a Bezier curve. The segment s1 is composed of a plurality of control points cp3 to cp5 and the segment of Bezier curve. The boundary curve shown in FIG. 5 is composed of two segments. Each segment has four control points. Note that the number of the segments and that of the control points may be arbitrary numbers. The two border curves A0 and A1 shown in FIG. 4 are closed curves which have the same number of segments and each of which does not intersect itself.

A program which is used by the processing unit 2 to perform a process in response to an operation input signal from the input device 6 is stored in the program memory 3. The program stored in the program memory 3 is read in response to a control signal supplied from the processing unit 2. The program stored in the program memory 3 is, for example, a curve edition program which is read when a boundary curve is edited.

Image data showing an object indicated with the boundary curve which is subjected to the edition process by the curve edition apparatus 1 is stored in the external storage unit 7. The external storage unit 7 incorporates a recording medium, for example, an optical disc so as to output image data indicating a dynamic image recorded on the recording medium to the processing unit 2, the data memory 4 and the frame memory 5 in response to a control signal supplied from the processing unit 2. Thus, image data is recorded on the recording medium.

The boundary curve and so forth indicating the border is stored in the data memory 4 by an operation at the processing unit 2. Moreover, for example, data obtained through the edition process of the boundary curve is stored to the data memory 4.

In response to a control signal supplied from the processing unit 2, for example, image data for one frame supplied from the data memory 4 or the external storage unit 7 is input to the frame memory 5. For example, image data read in response to the control signal supplied from the processing unit 2 and data indicating the boundary curve subjected to the edition process are input to the frame memory 5. The frame memory 5 is connected to a display unit 9 which displays an image and the contents of the process for a user. The frame memory 5 outputs, to the display unit 9, image data and so forth input in response to the control signal to cause the display unit 9 to display the image represented by image data above.

Figure 6:
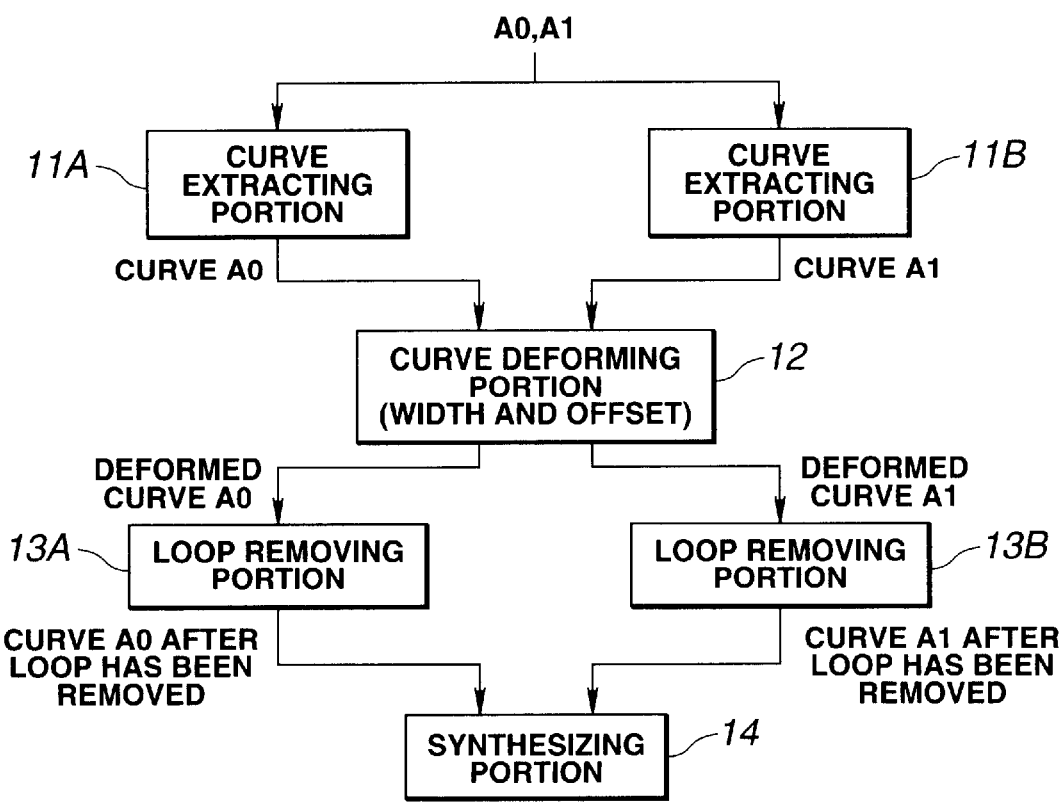
FIG. 6 is a block diagram showing the structure of a processing unit provided for the curve edition apparatus according to the present invention.

As shown in FIG. 6, the processing unit 2 incorporates curve extracting portions 11A and 11B, a curve deforming portion 12, loop removing portions 13A and 13B and a synthesizing portion 14.

For example, border curves A0 and A1 shown in FIG. 4 and instructed in response to the operation input signal supplied from the input device 6 are input to the curve extracting portions 11A and 11B. The curve extracting portion 11A extracts the border curve A0 of the two border curves A0 and A1 and output the extracted border curve A0 to the curve deforming portion 12. On the other hand, the curve extracting portion 11B extracts and outputs the border curve A1 of the two border curves A0 and A1 to the curve deforming portion 12.

Figure 7:
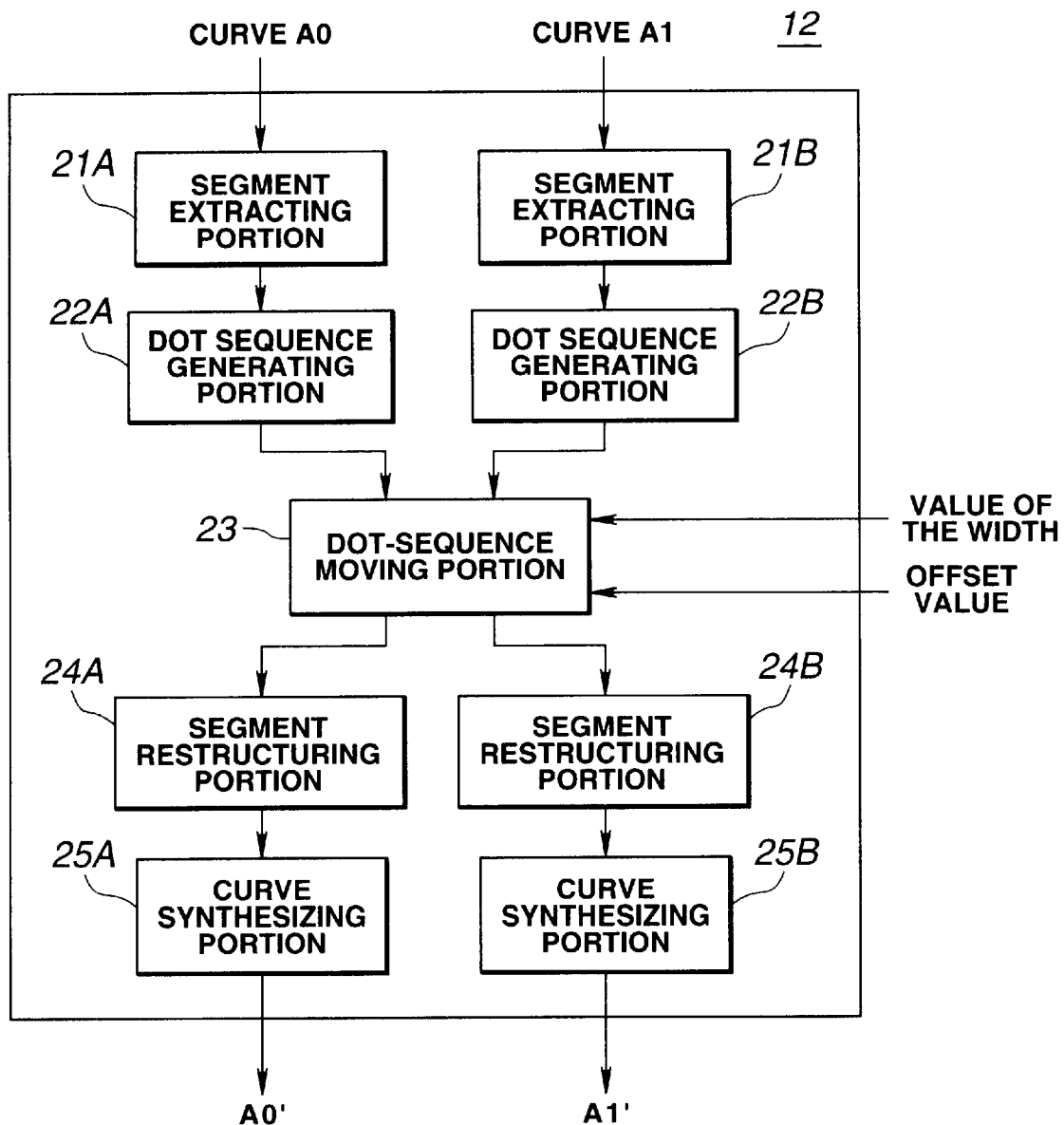
FIG. 7 is a block diagram showing the structure of a curve deforming portion provided for the processing unit.

As shown in FIG. 7, the curve deforming portion 12 incorporates segment extracting portions 21A and 21B to which the border curves A0 and A1 are input from the curve extracting portions 11A and 11B. Each of the segment extracting portions 21A and 21B, in segment units, performs extraction from the input border curves A0 and A1 so as to output results of the extraction to dot-sequence generating portions 22A and 22B. The segment extracting portions 21A and 21B extract a plurality of segments which constitute each of the border curves A0 and A1. Moreover, the segment extracting portions 21A and 21B output the segments to the dot-sequence generating portions 22A and 22B at predetermined processing timing.

The dot-sequence generating portions 22A and 22B convert the segments supplied from the segment extracting portions 21A and 21B into dot sequences so that dot sequences corresponding to the segments are produced. That is, the dot-sequence generating portions 22A and 22B subject each segment of the Bezier curve to a sampling process to convert the segments into the dot sequences so as to output the dot sequences to a dot-sequence moving portion 23.

Figure 8:
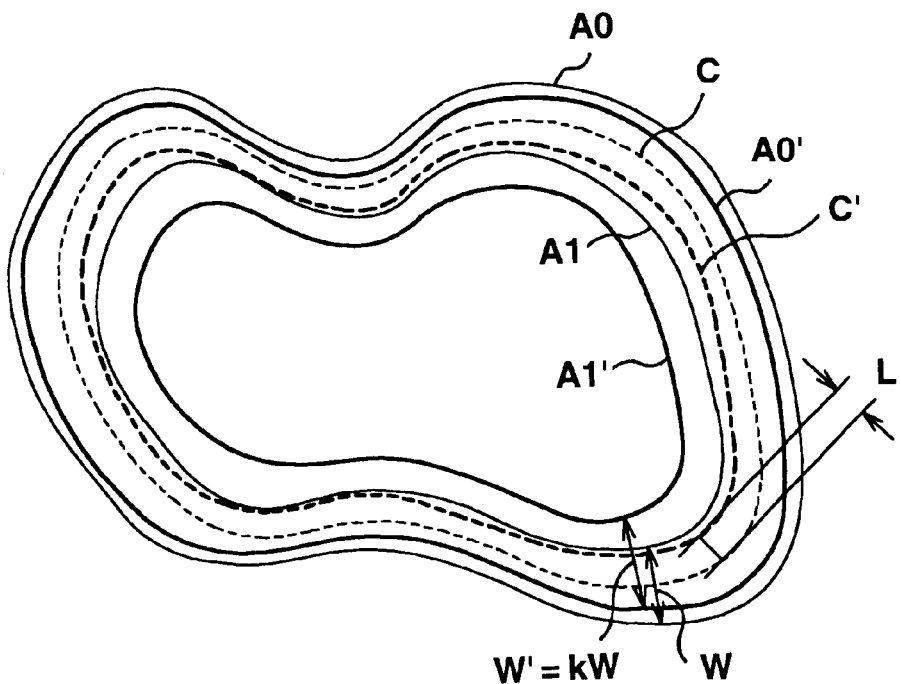
FIG. 8 is a diagram showing a process for multiplying the widths of the border curves A0 and A1 shown in FIG. 4 with k and inwards moving the border curves A0 and A1 for distance L.
Figure 9:
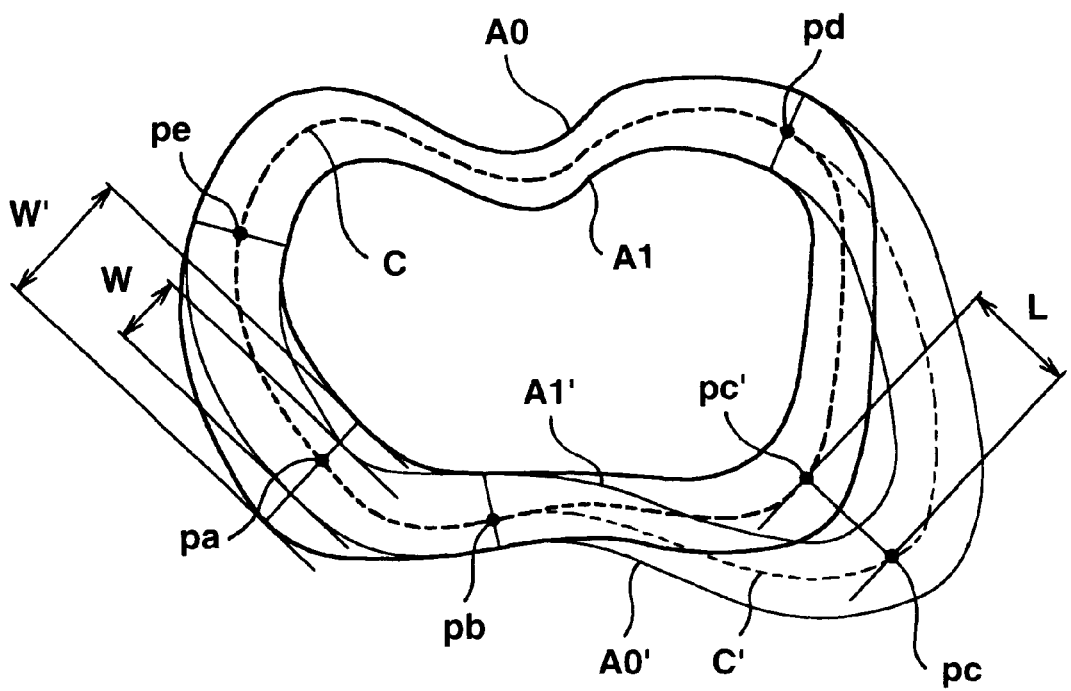
FIG. 9 is a diagram showing a process for outwards moving a portion adjacent to point pc on the border curves A0 and A1 shown in FIG. 4 and enlarging the width of a portion adjacent to point pa.

The dot-sequence moving portion 23 changes information about the coordinates indicating the coordinate position of each of dot sequences corresponding to the segments supplied from the dot-sequence generating portions 22A and 22B. The change is performed in accordance with the value of the width and the offset value specified in response to the operation input signal supplied from the input device 6. At this time, the dot-sequence moving portion 23 changes the coordinates of each point by using the dot sequence corresponding to the border curve A0 and the dot sequence corresponding to the border curve A1. In accordance with the value of the width and offset value for multiplying the overall widths of the border curves A0 and A1 shown in FIG. 4 with k and inwards moving the border curves A0 and A1 for a distance L, the dot-sequence moving portion 23 offsets central line C to position C', for example, as shown in FIG. 8. Moreover, the dot-sequence moving portion 23 changes information about the coordinates of each point in such a manner that the width W' is made to be kW. At this time, the dot-sequence moving portion 23 calculates an amount of movement corresponding to the dot sequence corresponding to each segment. Then, the dot-sequence moving portion 23 changes information about the coordinates of the dot sequence so as to output changed information to segment restructuring portions 24A and 24B. When a value of the width and an offset value for outwards moving point pc of the border curves A0 and A1 and enlarging the width adjacent to point pa are input as shown in FIG. 9, the dot-sequence moving portion 23 calculates a distance of movement according to the dot sequence corresponding to the segment to change information about the coordinates of the dot sequence.

The segment restructuring portions 24A and 24B restructure the dot sequences supplied from the dot-sequence moving portion 23 and corresponding to the segments so as to produce segments. The segment restructuring portion 24A restructures dot sequences corresponding to the segments which constitute the border curve A1. The segment restructuring portion 24B restructures dot sequences corresponding to the segments which constitute the border curve A0 to output the dot sequences to curve synthesizing portions 25A and 25B.

The curve synthesizing portions 25A and 25B synthesize the segments supplied from the segment restructuring portions 24A and 24B so as to produce border curves A0 and A1. Then, the curve synthesizing portions 25A and 25B produce the deformed border curves A0 and A1 as shown in FIG. 8 or 9 so as to output the border curves A0 and A1 to the loop removing portions 13A and 13B.

Figure 10:
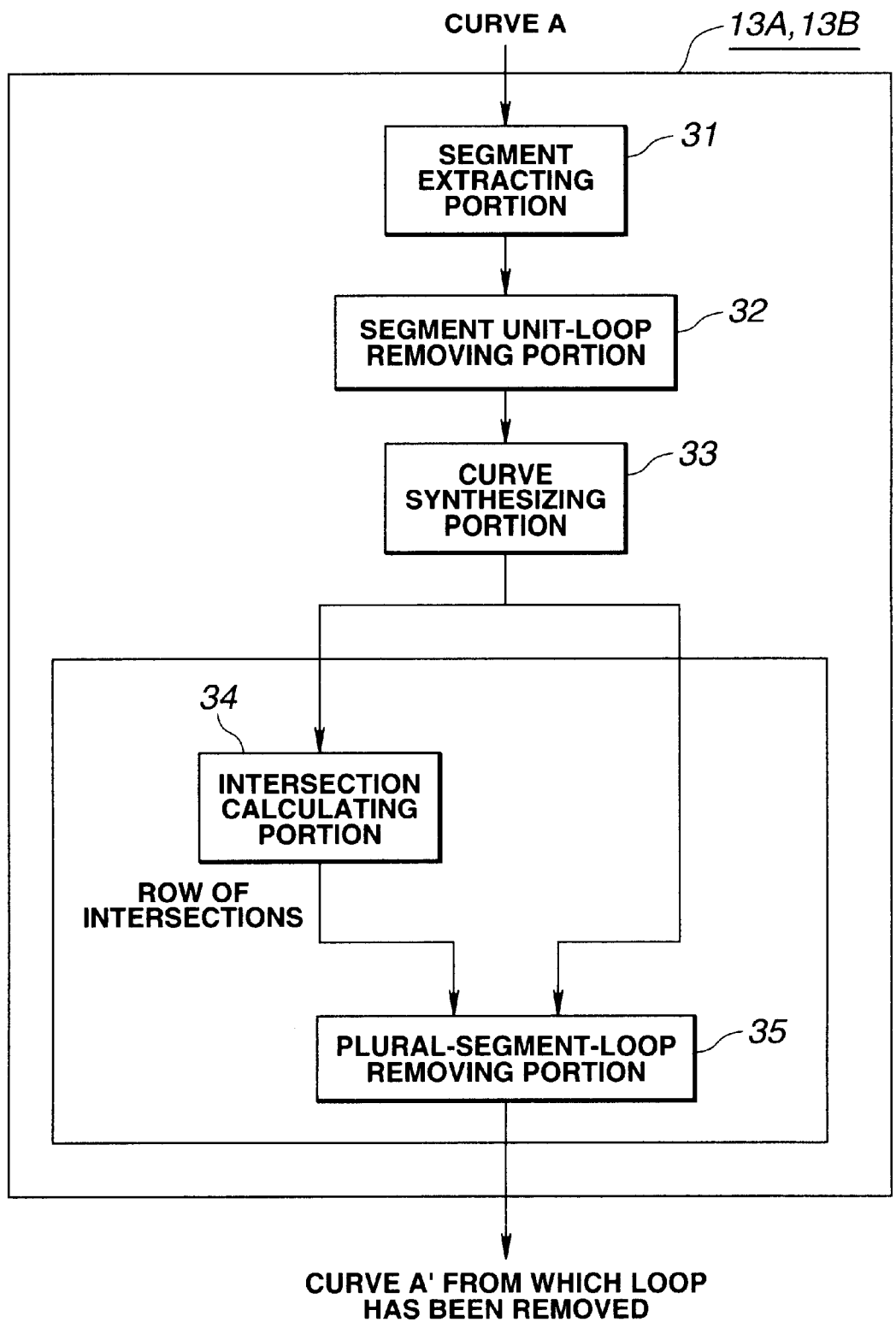
FIG. 10 is a block diagram showing the structure of a loop removing portion.

Each of the loop removing portions 13A and 13B is structured as shown in FIG. 10. Note that the two border curves A0 and A1 are simply called a "border curve A" in the description about the loop removing portions 13A and 13B shown in FIG. 10. The loop removing portions 13A and 13B are provided with a segment extracting portion 31 to which the deformed border curve A is input from the curve synthesizing portions 25A and 25B provided for the curve deforming portion 12. The segment extracting portion 31 performs a process for extracting a single segment from the border curve A supplied from the curve synthesizing portions 25A and 25B. The segment extracting portion 31 outputs the extracted segment to a segment unit-loop removing portion 32.

Figure 11:
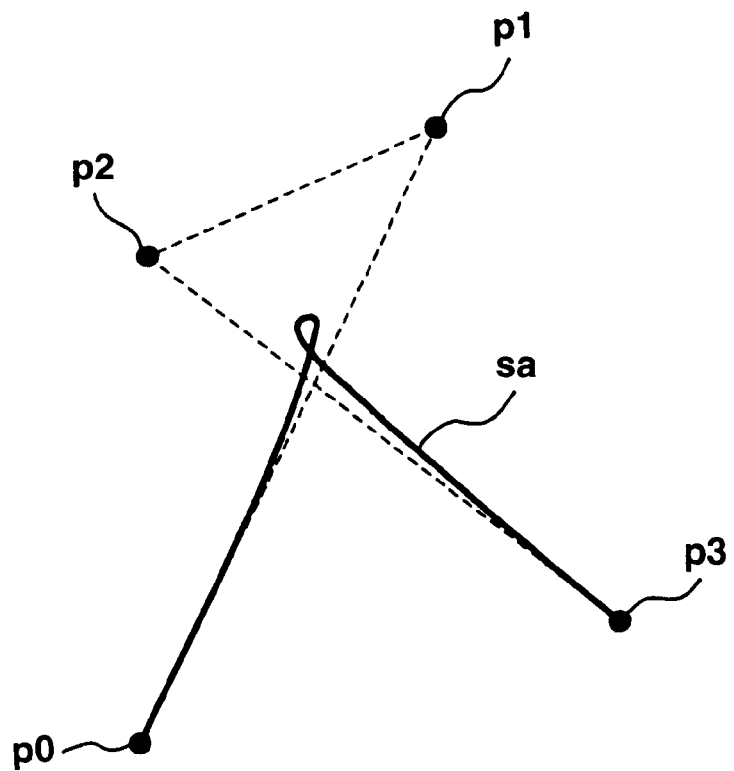
FIG. 11 is a diagram showing a loop formed in the boundary curve owing to deformation performed by the curve deforming portion.

The segment unit-loop removing portion 32 determines the single segment sa supplied from the segment extracting portion 31 whether or not a loop as shown in FIG. 11 has been generated in the border curve A as a result of the deformation performed by the curve deforming portion 12. When the segment unit-loop removing portion 32 has detected a loop composed of the single segment sa, the segment unit-loop removing portion 32 performs, for example, a process for reducing output velocity at a terminal point which constitutes the segment. Thus, the segment unit-loop removing portion 32 performs a process for removing the formed loop constituted by the single segment sa. Then, the segment unit-loop removing portion 32 outputs, to a curve synthesizing portion 33, the single segment sa subjected to the process for determining whether or not the loop has been formed and the process for removing the loop. Note that the detailed description of the process for determining whether or not a loop has been formed and the process for removing the loop which are performed by the segment unit-loop removing portion 32 is omitted.

The curve synthesizing portion 33 performs a process for synthesizing each segment extracted as the single segment by the segment extracting portion 31 and subjected to the process for removing the loop by the segment unit-loop removing portion 32. The curve synthesizing portion 33 outputs the synthesized border curve A to an intersection processing unit 34 and a plural-segment-loop removing portion 35.

Figure 12:
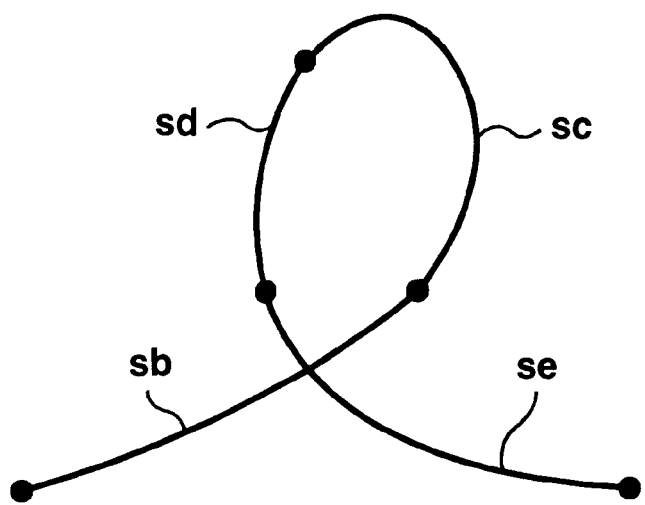
FIG. 12 is a diagram showing a loop formed by a plurality of segments.

The intersection processing unit 34 determines whether or not an intersection exists in the overall portion of the border curve A supplied from the curve synthesizing portion 33. Thus, the intersection processing unit 34 determines whether or not a loop has been formed in the overall portion of the border curve A as a result of the deformation performed by the curve deforming portion 12. As a result, the intersection processing unit 34 detects, for example, a loop composed of a plurality of segments sb to se as shown in FIG. 12. Then, the intersection processing unit 34 calculates intersections in the overall portion of the border curve A to produce a list of intersections so as to output the list to the plural-segment-loop removing portion 35.

The plural-segment-loop removing portion 35 uses the list of the intersections supplied from the intersection processing unit 34 to remove the intersections of the border curve A supplied from the curve synthesizing portion 33 so as to remove the loop formed by a plurality of the segments. The plural-segment-loop removing portion 35 outputs the border curve A to the synthesizing portion 14. Note that the process for removing the loop formed by the plural segments will be described later.

Referring back to FIG. 6, the synthesizing portion 14 synthesizes the border curve A0 supplied from the loop removing portion 13A and the border curve A1 supplied from the loop removing portion 13B which have been described with reference to FIG. 10. Thus, the curve edition apparatus 1 obtains the border curves A0 and A1 deformed by the curve deforming portion 12.

Figure 13:
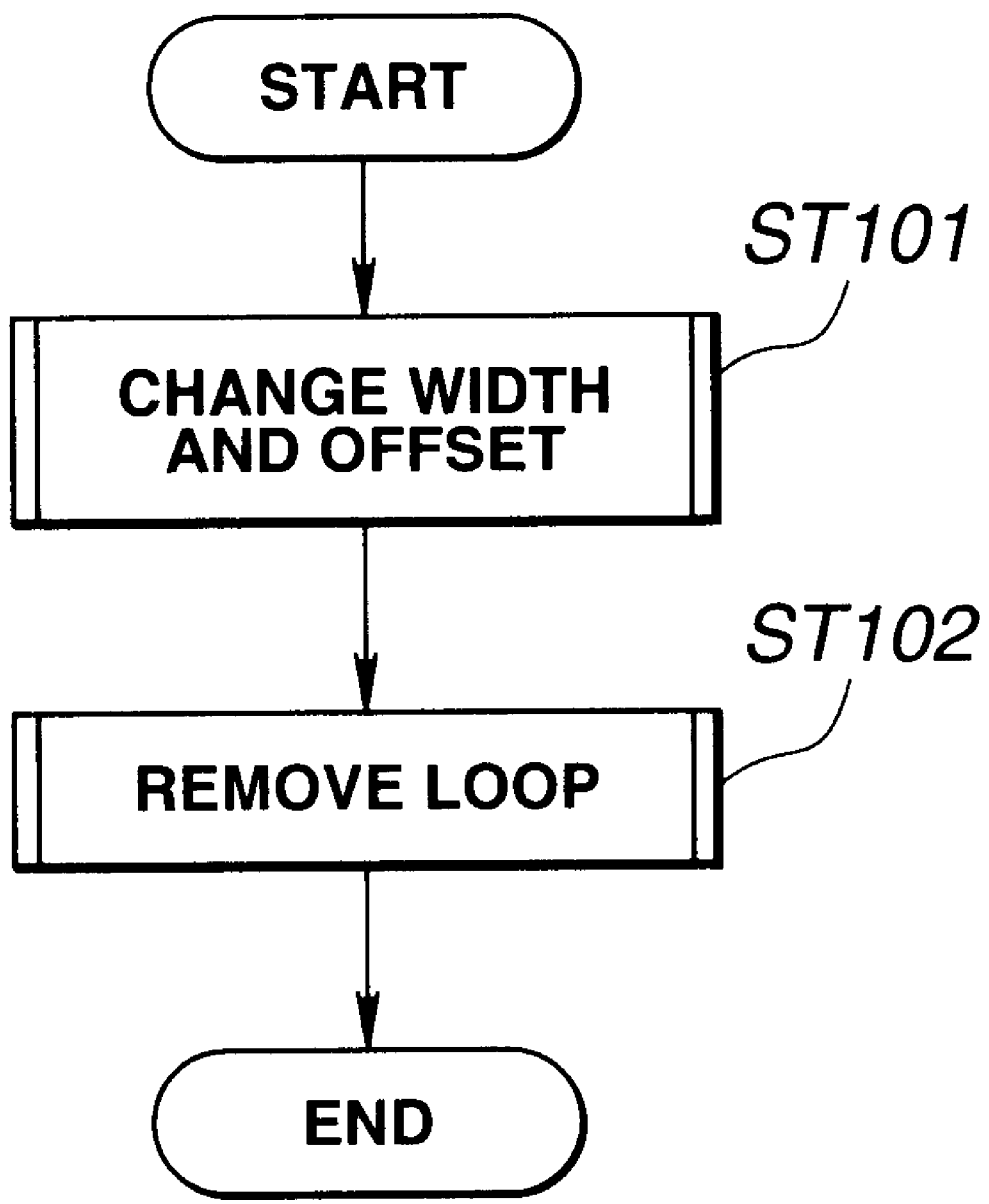
FIG. 13 is a flow chart of a process which is performed by the processing unit to deform two boundary curves.

When the curve edition apparatus 1 deforms the two border curves A0 and A1, the processing unit 2 performs a process shown in a flow chart shown in FIG. 13. That is, the processing unit 2, in step ST101, causes, in main, the elements shown in FIG. 7 to perform the process for changing the widths of the border curves A0 and A1 and the offset value. In step ST102, mainly the elements shown in FIG. 10 perform the process for detecting and removing the loop formed owing to the deformation of the border curves A0 and A1.

Figure 14:
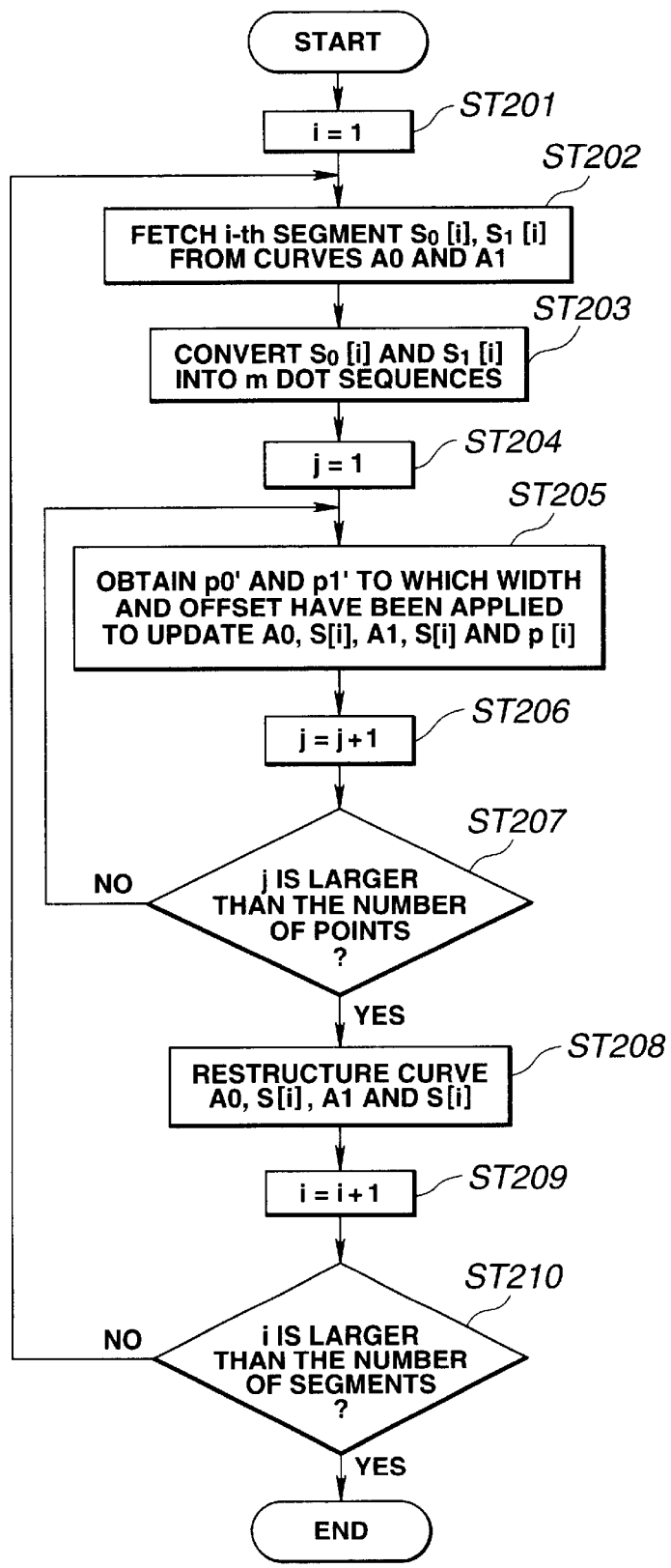
FIG. 14 is a flow chart of a process which is performed by the curve deforming portion to deform the boundary curve.

When the border curves A0 and A1 are deformed in step ST101, an instruction is issued in step ST201 to cause the segment extracting portions 21A and 21B to extract segment i=1 (i=1, 2, 3, . . . ) from the border curves A0 and A1, as shown in FIG. 14.

In step ST202 the segment extracting portions 21A and 21B extract segment S0(i) from the border curve A0 and segment S1(i) from the border curve A1 instructed in step ST201 to output the extracted segments S0(i) and S1(i) to the dot-sequence generating portions 22A and 22B.

In step ST203 the dot-sequence generating portion 22A performs a process for converting the segment S0(i) supplied from the segment extracting portion 21A into m-dot sequence p0(1) to p0(m). On the other hand, the dot-sequence generating portion 22A performs a process for converting the segment S1(i) supplied from the segment extracting portion 21B into m-dot sequence p1(l) to p1(m). The dot-sequence generating portion 22A outputs the produced dot sequence p0(1) to p0(m) to the dot-sequence moving portion 23. On the other hand, the dot-sequence generating portion 22B outputs the produced dot sequence p1(1) to p1(m) to the dot-sequence moving portion 23.

In step ST204 the dot-sequence moving portion 23 instructs to change information about the coordinates about points p0(j) and p1(j) of j=1 (j=1, 2, 3, . . . ) in the dot sequences supplied from the dot-sequence generating portions 22A and 22B.

In step ST205 the dot-sequence moving portion 23 changes information about the coordinates of the instructed points p0(j) and p1(j) in accordance with the value of the width and the offset value instructed in response to the operation input signal supplied from the input device 6.

Figure 15A:
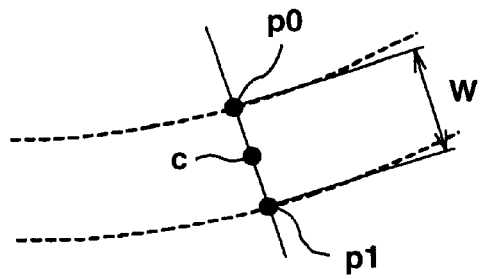
FIG. 15 is a diagram showing a method of calculating information about the coordinates which is used when points p0 and p1 on the boundary curve shown in FIG. 15A are moved to points p0' and p1' on the boundary curve shown in FIG. 15B.
Figure 15B:
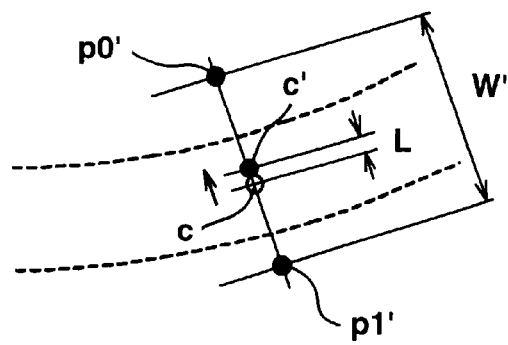

A method will now be described which is employed by the dot-sequence moving portion 23 for calculating information about the coordinates to move the points p0 and p1 to points p0' and p1' shown in FIG. 15B by using the value of the width and the offset value as shown in FIG. 15A. The points p0, p1, p0', p1' and c are position vectors. The dot-sequence moving portion 23 also moves the central point c located on a straight line which connects the point p0' and p1' to each other to the central point c'. As a result, the dot-sequence moving portion 23 changes the width from W to W' and moves the central point c for a distance L.

When information about the coordinates is calculated, a fact that the point c is a midpoint of the point p0 and the point p1 results in c being expressed as follows:

$$c = (p0 + p1)/2$$

Assuming that W is the distance between the point p0 and the point p1 and W' is the distance between the point p0' and the point p1', W and W' are expressed by the following equations:

$w=|p1-p0|$ $W'=|p1'-p0'|$

Note that L is the distance from the central point c to the moved point c' after deformation has been performed, that is, the offset value. When offset has been performed in a direction from the point p0' to the point p1', L takes a positive value.

Assuming that a unit vector running parallel to vector p0p1 is u, u is expressed by the following equation:

$u=(p0-p1)|p1-p0|$

The foregoing equations are used to obtain the coordinates of the moved points p0' and p1' by the following equations:

$p0'=c-\{(W/2)-L\}\cdot u$ $p1'=c+\{(W/2)-L\}\cdot u$

The dot-sequence moving portion 23 performs the foregoing calculations to change information about the coordinates of the point p0 and p1 in accordance with the value of the width and the offset value.

In step ST206 the dot-sequence moving portion 23 instructs to increment "j" so as to change information about the coordinates of next points p0(j) and p1(j).

In step ST207 the dot-sequence moving portion 23 determines whether or not the points instructed in step ST206 is larger than the number of the dot sequence corresponding to the i-th segment. If an affirmative determination is made, the process proceeds to step ST208. If a negative determination is made, the operation is returned to step ST205. That is, the dot-sequence moving portion 23 performs the process in step ST205 for updating information about the coordinates of each of points constituting the dot sequence corresponding to the i-th segment instructed in step ST201 in accordance with the value of the width and the offset value.

In step ST208 the segment restructuring portions 24A and 24B restructure segments from the dot sequence having information about the coordinates which have been updated by the dot-sequence moving portion 23. The segment restructuring portions 24A and 24B use, for example, a method disclosed in Japanese Patent Laid-Open No. 10-134199 to constitute the segments from the dot sequence. Specifically, the segment restructuring portions 24A and 24B calculate, for each point, linking conditions for linking the points which constitute the dot sequence. Then, the segment restructuring portions 24A and 24B constitute the segments in such a manner that the linking conditions for each point are satisfied.

In step ST209 the processing unit 2 increments the segment, which must be subjected to the deforming process, to instruct an i+1 th segment which is a next segment. In step ST210 a determination is made whether or not the i+1 th segment instructed in step ST209 is larger than the number of segments which constitute the border curves A0 and A1. If an affirmative determination is made, the deforming process of the border curves A0 and A1 is completed. If a negative determination is made, the i+1 th segment is subjected to the foregoing processes in steps ST202 to ST210. That is, the curve deforming portion 12 subjects all segments which constitute the border curves A0 and A1 to the deforming process in accordance with the value of the width and the offset value produced in response to the operation input signal.

Therefore, the curve edition apparatus 1 causes the curve deforming portion 12 to deform the border curves A0 and A1 as follows: the dot-sequence generating portions 22A and 22B convert the two border curves A0 and A1 for each segment into the dot sequence to change information about the coordinates of the dot sequence so as to perform the edition process. At this time, the dot sequence of each border curve A0 and that of the border curve A1 are linked to one another to change information about the coordinates of each point. Then, the two border curves A0 and A1 are restructured from the coordinates of each point, the coordinates of which have been changed. Therefore, the two border curves A0 and A1 showing the border of the object in the image can easily be edited. That is, the curve edition apparatus 1 produces the value of the width and the offset value in response to the operation input signal supplied from the input device 6 in accordance with an instruction issued from a user. Thus, the curve edition apparatus 1 automatically performs the process shown in FIG. 14 to edit the shapes of the border curves A0 and A1.

Figure 16:
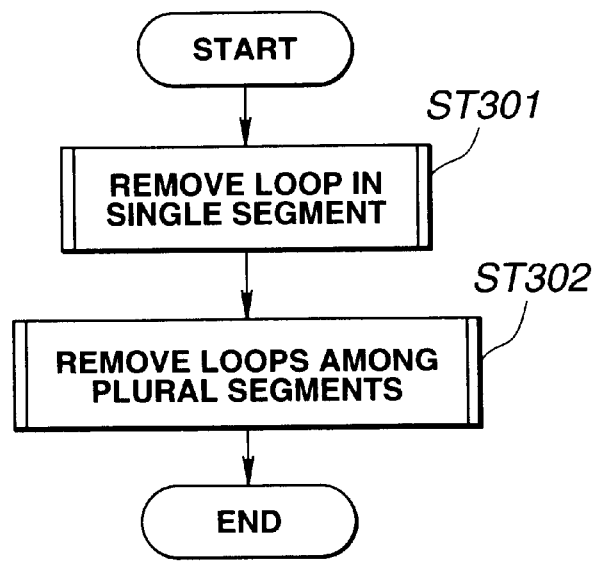
FIG. 16 is a flow chart of a process which is performed by a loop removing portion to remove a loop formed owing to a deformation process of each boundary curve which is performed by the curve deforming portion.

Then, a loop formed owing to the deforming process of the border curves A0 and A1 performed by the curve deforming portion 12 is removed by the loop removing portions 13A and 13B shown in FIG. 10. As shown in FIG. 16, a loop constituted by a single segment which constitutes the border curves A0 and A1 is removed in step ST301. In step ST302 a loop constituted by a plurality of segments is removed.

Figure 17:
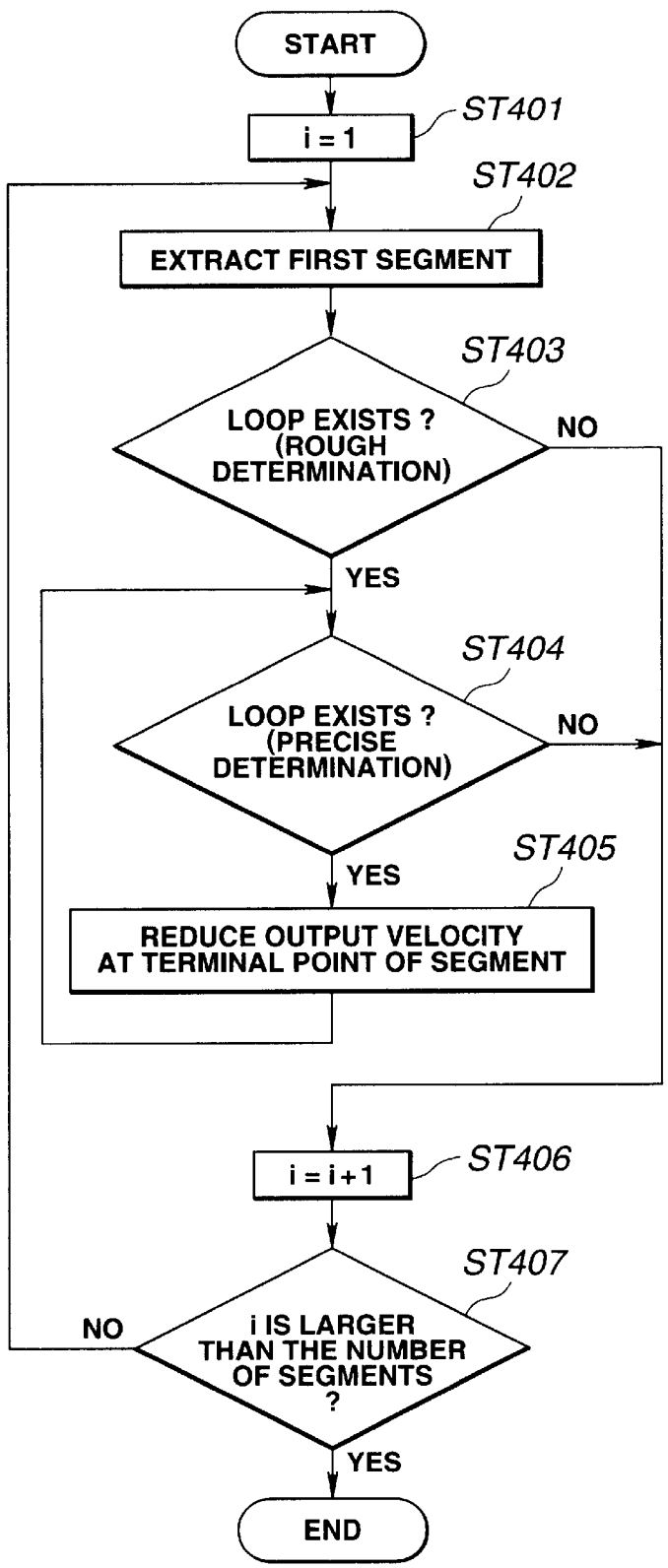
FIG. 17 is a flow chart of a process which is performed by the loop removing portion to remove a loop formed by a single segment.

When the loop removing portions 13A and 13B remove the loop constituted by a single segment, the loop removing portions 13A and 13B starts the process in step ST401 by issuing an instruction to remove a loop of the i=1 th segment which constitutes the border curves A0 and A1, as shown in FIG. 17.

In step ST402 the loop removing portions 13A and 13B cause the segment extracting portion 31 to extract a single segment which constitutes the border curves A0 and A1 instructed in step ST401 or step ST406 to output the single segment to the segment unit-loop removing portion 32.

Figure 18:
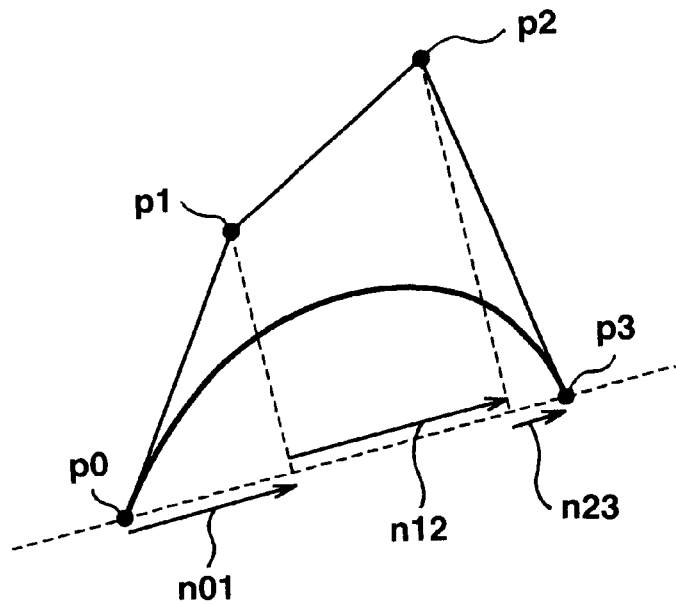
FIG. 18 is a diagram showing an example of a rough determination to detect the possibility whether or not a segment has a loop.

In step ST403 the segment unit-loop removing portion 32 performs a rough determination whether or not a loop exists in the segment extracted by the segment extracting portion 31 in step ST402. That is, the segment unit-loop removing portion 32 performs the determination of the segment shown in FIG. 18 such that the segment unit-loop removing portion 32 detects directions realized when vector n01 corresponding to terminal points p0 to p1, vector n12 corresponding to control points p1 to p2 and vector n23 corresponding to control points p2 to p3 are projected onto a straight line which connects terminal point p0 and terminal point p3 to each other. The velocities of the points on the border curves A0 and A1 are obtained by performing interior divisions of the vectors n01, n12 and n23. Therefore, if a loop exists, the points on the border curves A0 and A1 temporarily face an inverse direction with respect to the straight line which connects the terminal point p0 and the control point p3 to each other. Hence it follows that any one of the detected vectors n01, n12 and n23 must be formed in the inverse direction. Therefore, the segment unit-loop removing portion 32 detects the directions of the detected vectors n01, n12 and n23 so that the rough determination is performed.

Figure 19:
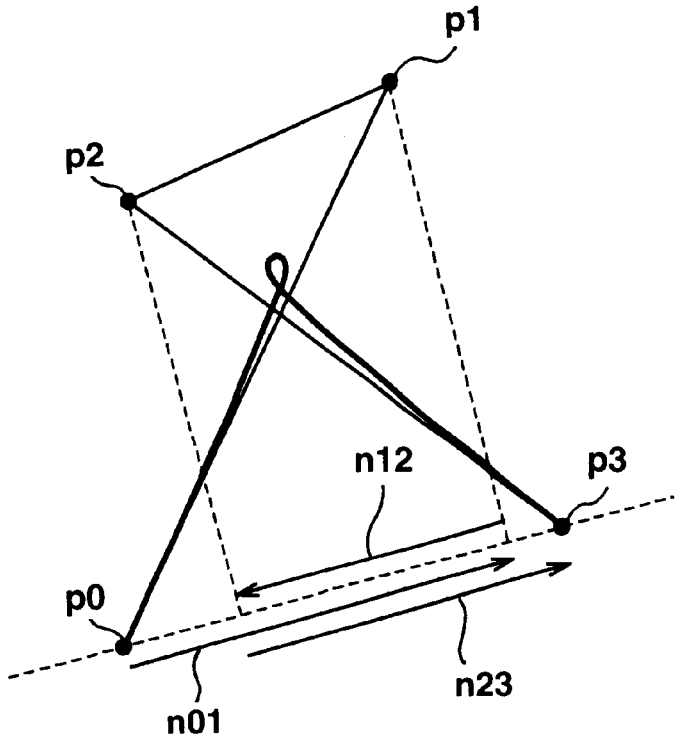
FIG. 19 is a diagram showing another example of a rough determination to detect the possibility whether or not a segment has a loop.
Figure 20:
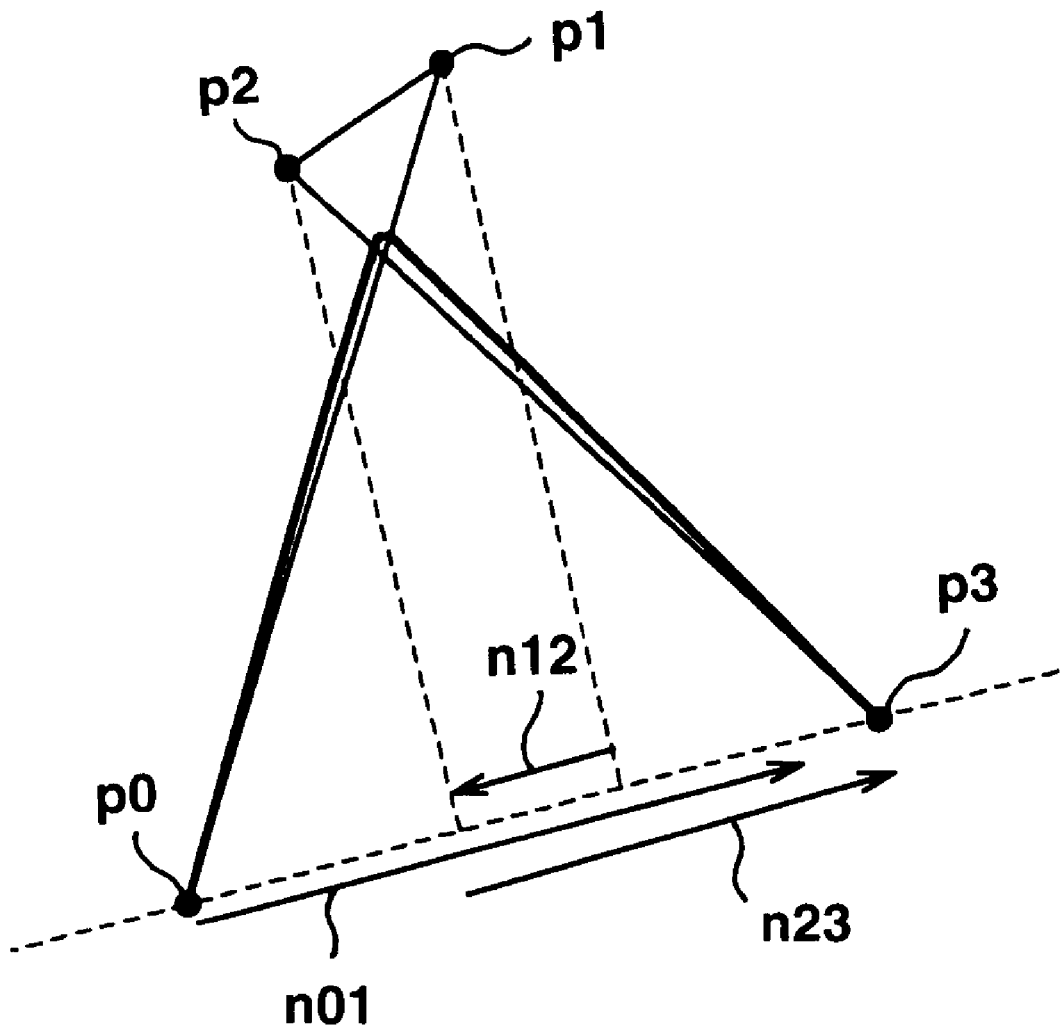
FIG. 20 is a diagram showing another example of a rough determination to detect the possibility whether or not a segment has a loop.

That is, the segment unit-loop removing portion 32 determines a segment, for example, as shown in FIG. 19 that a loop exists in a single segment because the vector n01 and the vector n23 are formed in the same direction and the vector n12 is formed in the inverse direction. Moreover, the segment unit-loop removing portion 32 determines a segment, for example, as shown in FIG. 20 that a loop exists in a single segment because the vector n01 and the vector n23 are formed in the same direction and the vector n12 is formed in the inverse direction.

When the segment unit-loop removing portion 32 has determined formation of a loop constituted by a single segment in step ST403, the operation proceeds to step ST404. If the segment unit-loop removing portion 32 has determined that no loop has been formed, the operation proceeds to step ST406.

In step ST405 the segment unit-loop removing portion 32 performs a precise determination which is more precise than the rough determination because there is a possibility that a loop is formed in the i-th segment owing to the rough determination. If the segment unit-loop removing portion 32 determines existence of a loop as a result of the precise determination, the operation proceeds to step ST405. If the segment unit-loop removing portion 32 determines that no loop exists, the operation proceeds to step ST406. Note that the precise determination which is performed by the segment unit-loop removing portion 32 will be described later.

Figure 21A:
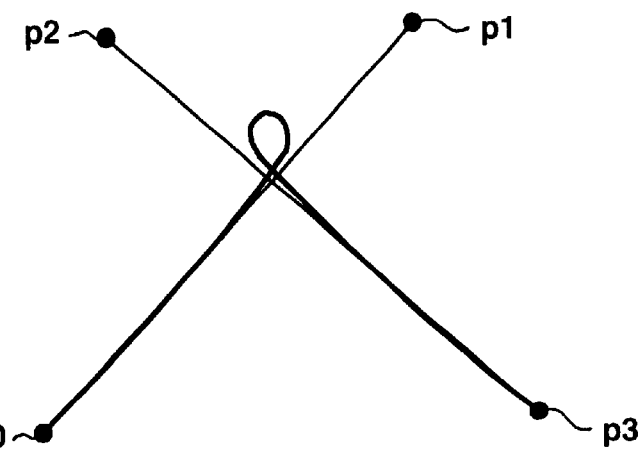
FIG. 21A is a diagram showing output velocity and 21B is a diagram showing removal of a loop by shortening p0p1 and p3p2 by a process performed by a segment-unit-loop removing portion to reduce the output velocity.
Figure 21B:
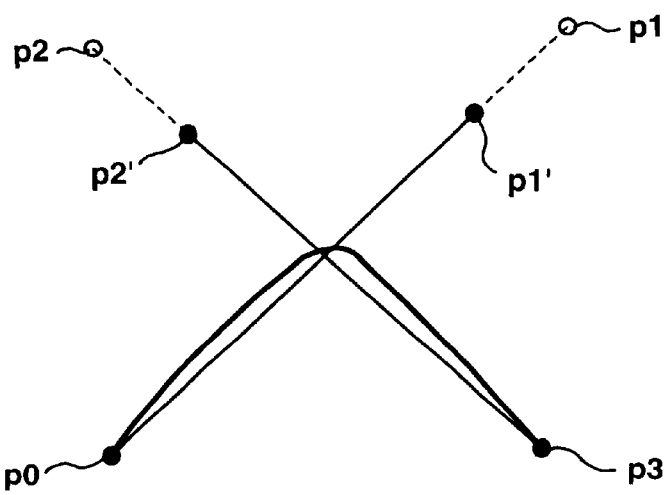

In step ST405 the segment unit-loop removing portion 32 performs a process for reducing the output velocity at the terminal point of the segment in order to remove the loop existing in a single segment. The output velocity is p0p1 and p3p2 of, for example, a segment shown in FIG. 21A. The segment unit-loop removing portion 32 performs the process for reducing the output velocity to shorten p0p1 and p3p2, changing the position of the control point p2 to p2' and changing the position of the control point p1 to p1', as shown in FIG. 21B. Thus, the segment unit-loop removing portion 32 removes the loop. The segment unit-loop removing portion 32 again subjects the segment subjected to the process for reducing the output velocity to the precise determination in step ST404. That is, the segment unit-loop removing portion 32 performs the process for reducing the output velocity in step ST405 until the segment unit-loop removing portion 32 determines that no loop is formed as a result of the precise determination.

In step ST406 the segment unit-loop removing portion 32 increments the segment which constitutes the border curves A0 and A1 so as to instruct the i+1 th segment. In step ST407 the segment unit-loop removing portion 32 determines whether or not the i+1 th segment instructed in step ST406 is larger than the number of segments which constitute the border curves A0 and A1. If an affirmative determination is made, the process for removing a loop in the border curves A0 and A1 is completed. If a negative determination is made, the i+1 th segment is subjected to the processes in steps ST402 to ST407. That is, the segment unit-loop removing portion 32 subjects all of the segments which constitute the border curves A0 and A1 to the process for removing the loop.

Figure 22:
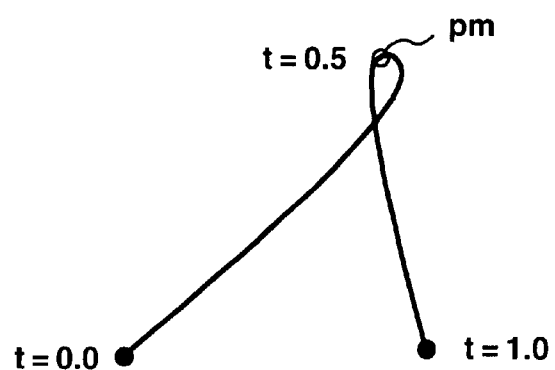
FIG. 22 is a diagram showing a process for dividing a segment expressed with coordinates t=0 to t=1 at a position having the coordinates t=0.5 to form two segments.

The precise determination in step ST404 will now be described. The segment unit-loop removing portion 32 performs the precise determination as shown in FIG. 22 such that the segment extracted by the segment extracting portion 31 and expressed by coordinates t=0 to t=1 is, in step ST402, divided at a position having the coordinate t=0.5 into two segments. Then, the segment unit-loop removing portion 32 determines whether or not the two segments realized by the division intersect. When the segment unit-loop removing portion 32 has determined that the two segment intersect at only the portion having the coordinate t=0.5, the segment unit-loop removing portion 32 determines that no loop is formed by the single segment extracted by the segment extracting portion 31. When the segment unit-loop removing portion 32 has determined that the two segments intersect at a position except for the position having the coordinate t=0.5, the segment unit-loop removing portion 32 determines that a loop is formed by the single segment extracted by the segment extracting portion 31.

Figure 23:
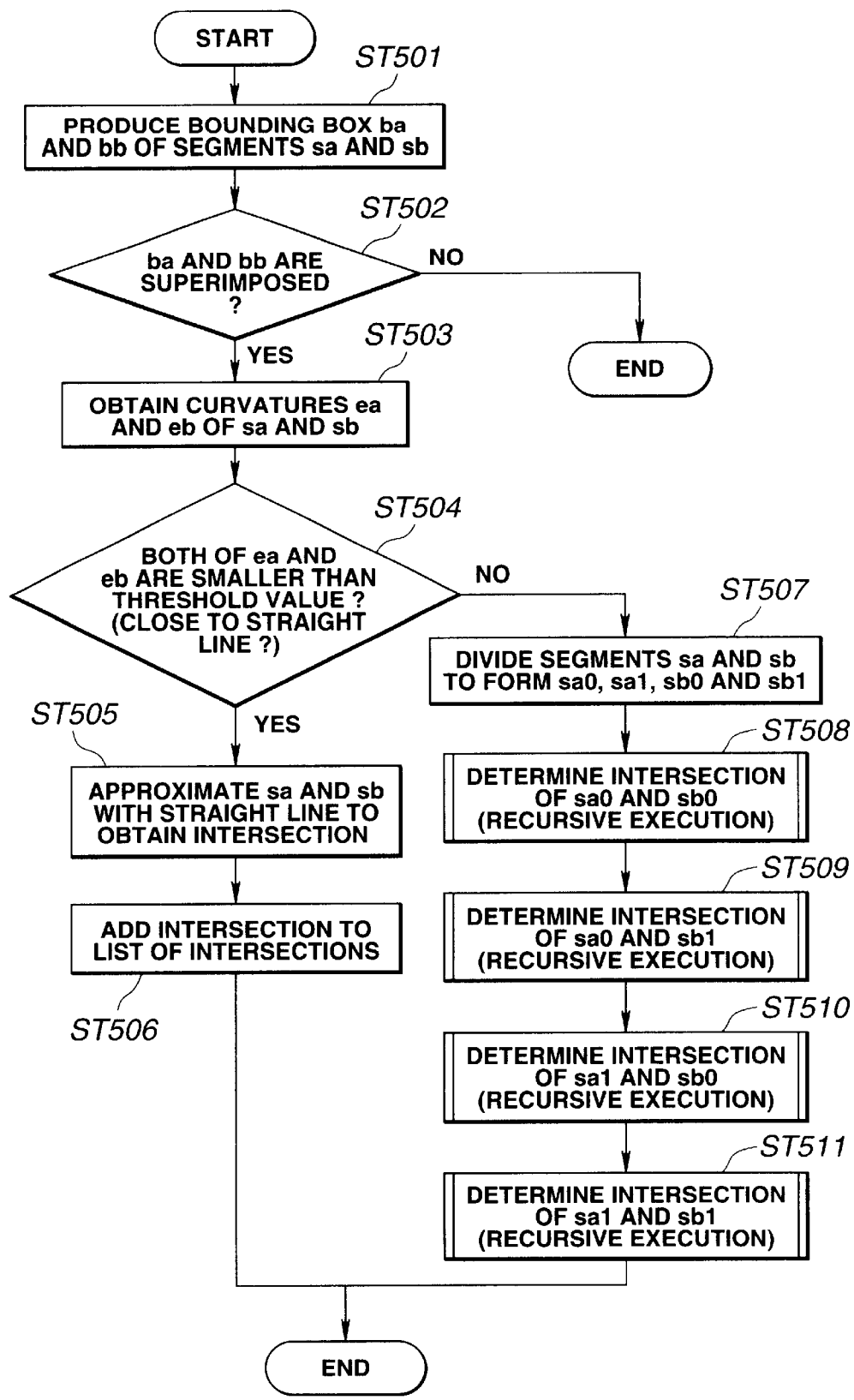
FIG. 23 is a flow chart of a process for determining whether or not the two segments formed by dividing one segment intersect.
Figure 24:
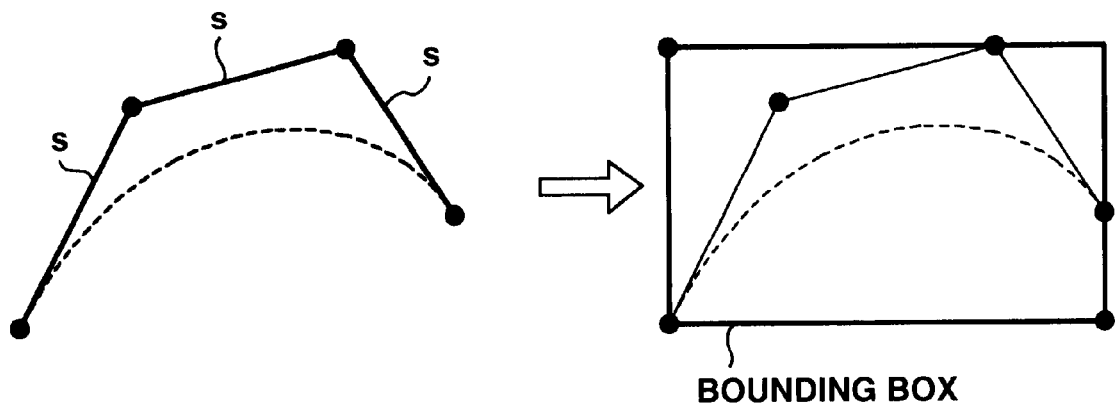
FIG. 24 is a diagram showing a bounding box formed to surround each segment formed by the dividing operation.

That is, the segment unit-loop removing portion 32 performs a process in the flow chart shown in FIG. 23 to determine whether or not the two segments formed by dividing the single segment intersect. In step ST501 the segment unit-loop removing portion 32 produces bounding boxes ba and bb for the two segments sa and sb formed by the dividing operation. The bounding box is, as shown in FIG. 24, a rectangular region formed by connecting terminal points or control points of each segment s to one another and surrounding the segment.

In step ST502 the segment unit-loop removing portion 32 determines whether or not the bounding box for the segment sa and that bounding box for the segment sb are superimposed. If the segment unit-loop removing portion 32 makes an affirmative determination, the operation proceeds to step ST503. If a negative determination is made, the segment unit-loop removing portion 32 determines that no intersection exists except for the coordinate t=0. Thus, the process is completed.

Figure 25:
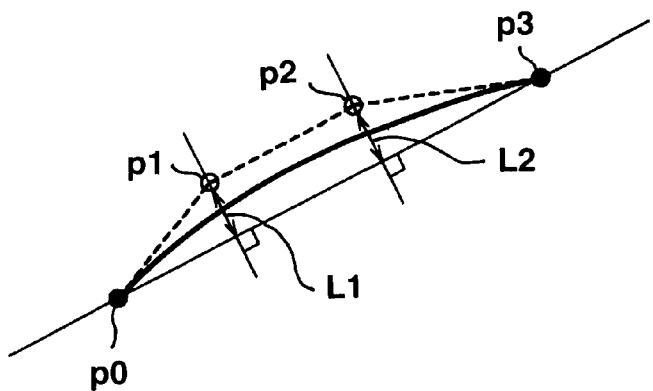
FIG. 25 is a diagram showing the curvature of each segment formed by dividing the segment by segment-unit-loop removing portion.

In step ST503 the segment unit-loop removing portion 32 obtains a curvature ea of the segment sa and a curvature eb of the segment sb. As shown in FIG. 25, the segment unit-loop removing portion 32 processes a segment composed of terminal points p0 and p3, central points p1 and p2 and a line segment to obtain the curvatures ea and eb by using the total sum of the squares of length L1 of a perpendicular connecting the control point p1 and straight line p0p3 to each other and length L2 of the perpendicular connecting the control point p2 and straight line p0p3 to each other. The foregoing total sum is used as an approximation. When the obtained approximation approximates zero, the segment closes a straight line.

In step ST504 the segment unit-loop removing portion 32 makes a comparison among the curvatures ea and eb obtained in step ST503 with a predetermined threshold value. The threshold value is a value determined according to a fact whether or not the segments sa and sb can be approximated to segments of a straight line. When the segment unit-loop removing portion 32 determines that the curvatures ea and eb are smaller than the threshold value and the foregoing segments can be approximated to the segments of a straight line, the operation proceeds to step ST505. When the segment unit-loop removing portion 32 determines that the curvatures ea and eb are not smaller than the threshold value and the foregoing segments cannot be approximated to the segments of a straight line, the operation proceeds to step ST507.

Figure 26:
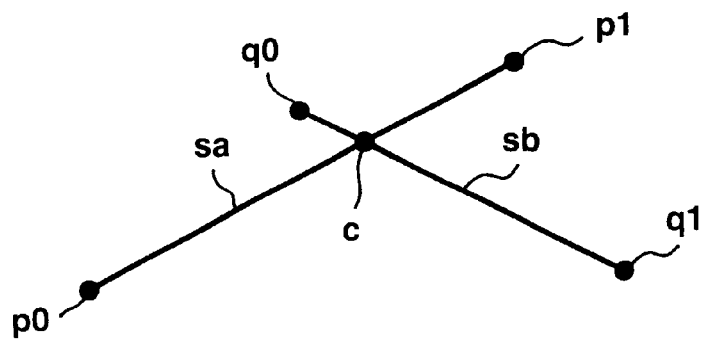
FIG. 26 is a diagram showing a process for approximating segment sa to straight line p0p1 and approximating segment sb with straight line q0q1 to obtain intersection c.

In step ST505 the segment unit-loop removing portion 32 approximates the segment sa to straight line p0p1 and the segment sb to straight line q0q1 as shown in FIG. 26 to obtain the intersection c. In step ST506 the segment unit-loop removing portion 32 adds the obtained intersection c to the list of intersections.

In step ST507 the segment unit-loop removing portion 32 furthermore divides the segment sa to create segments sa0 and sa1 and the segment sb to create segments sb0 and sb1.

In steps ST508, ST509, ST510 and ST511, the segment unit-loop removing portion 32 uses the segments formed in step ST507 to perform the processes from steps ST501 to ST506 to obtain intersections so as to produce a list of intersections.

Figure 27A:
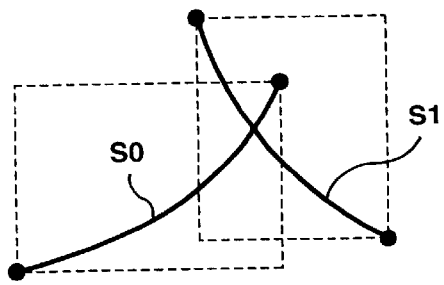
FIG. 27A is a diagram showing two segments obtained by the dividing operation and a bounding box.
Figure 27B:
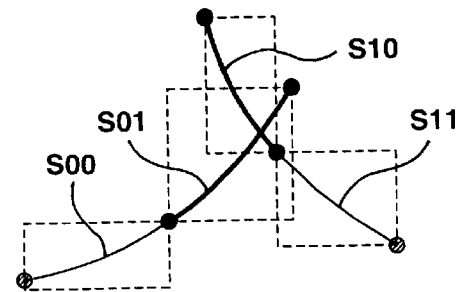
FIG. 27B is a diagram showing a process for furthermore dividing each segment shown in FIG. 27A
Figure 27C:
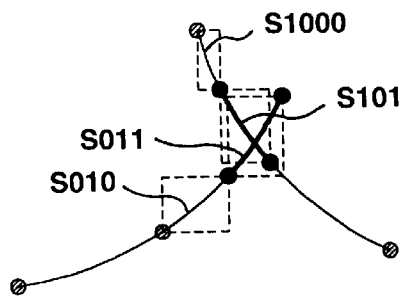
FIG. 27C is a diagram showing a process for furthermore dividing each segment shown in FIG. 27B such that a rectangular region surrounded by the bounding box is reduced.

That is, the segment unit-loop removing portion 32, in step ST507, furthermore divides two segments s0 and s1 obtained by performing, for example, division as shown in FIG. 27A so that segments s01 and s00 and segments s10 and s11 as shown in FIG. 27B are obtained. Then, the processes in step ST501 to ST504 are again performed so that a determination is made whether or not a straight line can be approximated to segments s01 and s10 is determined. When the segment unit-loop removing portion 32 has determined that a straight line cannot be approximated to each of the segments s01 and s10, the segment unit-loop removing portion 32 furthermore divides the segment. Thus, segments s011, s010, s100 and s101 as shown in FIG. 27C are obtained. The rectangular region surrounded by the bounding box is reduced. The segment unit-loop removing portion 32 performs the processes in steps ST501 to ST504 until the divided segments can be approximated with a straight line. Thus, the segment unit-loop removing portion 32 obtains the intersection of the divided segments.

As described above, the segment unit-loop removing portion 32 subjects the segments sa0 and sb0 to the processes in steps ST501 to ST504. Thus, the segment unit-loop removing portion 32 obtains the intersection between the segment sa0 and the segment sb0.

Figure 28:
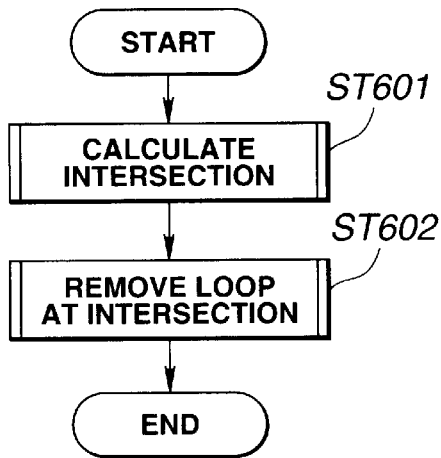
FIG. 28 is a flow chart of a process which is performed by the loop removing portion to remove a loop formed by a plurality of segments.

When a loop constituted by a plurality of segments is removed by the loop removing portions 13A and 13B, the intersection of a loop constituted by a plurality of segments is calculated by the intersection processing unit 34 in step ST601 in the flow chart shown in FIG. 28. In step ST602 the plural-segment-loop removing portion 35 performs a process using the intersection obtained in step ST601 to remove the loop constituted by the plural segments.

Figure 29:
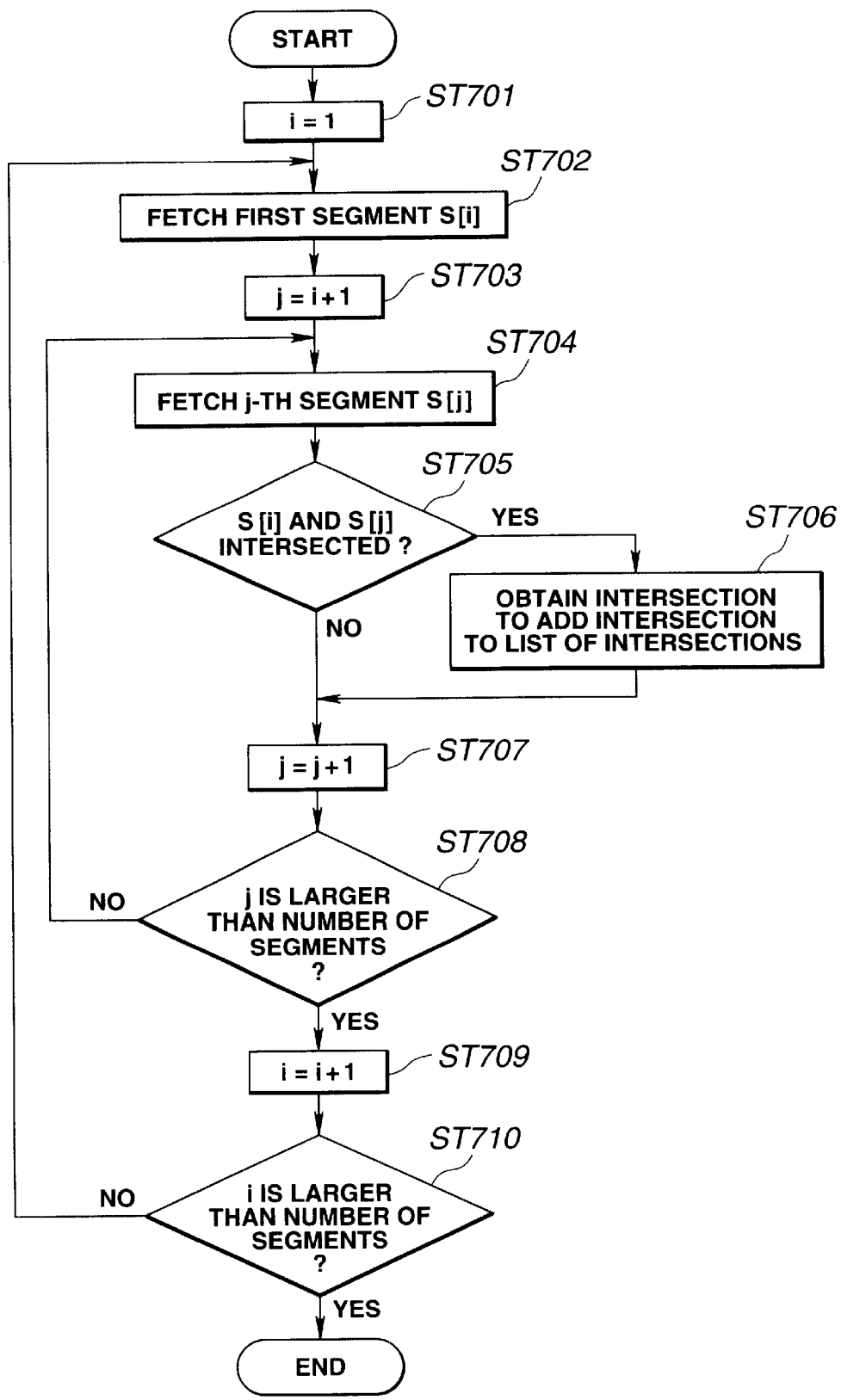
FIG. 29 is a flow chart of a process which is performed by an intersection processing unit to calculate an intersection formed by a plurality of segments.

In step S601 the intersection processing unit 34 performs a process in the flow chart shown in FIG. 29. In step ST701 the intersection processing unit 34 instructs a segment in the border curves A0 and A1 produced by synthesizing the segment by the curve synthesizing portion 33. The intersection of the instructed segment is calculated. In this case, the intersection processing unit 34 first extracts segment i=1.

In step ST702 the intersection processing unit 34 extracts segment s(i) instructed in step ST701 or step S709.

In step ST703 the intersection processing unit 34 instructs j-th segment s(j) adjacent to the i-th segment s(i) instructed in step ST702.

In step ST704 the intersection processing unit 34 instructs the j-th segment s(j) instructed in step ST703 from the border curves A0 and A1.

In step ST705 the intersection processing unit 34 subjects the segments s(i) and s(j) to the foregoing process described with reference to FIG. 23. Thus, the intersection processing unit 34 determines whether or not the segments s(i) and s(j) intersect. If the intersection processing unit 34 determines the segments s(i) and s(j) intersect, the operation proceeds to step ST706. If the intersection processing unit 34 determines that the segments s(i) and s(j) do not intersect, the operation proceeds to step ST707.

In step ST706 the intersection processing unit 34 performs a process for adding the intersection obtained in step ST705 to the list of intersections.

In step ST707 the intersection processing unit 34 increments j to instruct a segment s(j+1) which is next to the segment s(j) and which is determined whether or not the segment s(j+1) intersects the segment s(i).

In step ST708 the intersection processing unit 34 determines whether or not the segment s(j+1) instructed in step ST707 is larger than the number of the segments which constitute the border curves A0 and A1. If an affirmative determination is made, the operation proceeds to step ST709. If a negative determination is made, the operation is returned to step ST704. That is, the intersection processing unit 34 subjects the i-th segment s(i) and another segment except for the i-th segment s(i) to the processes in steps ST704 to ST708. Thus, the intersection processing unit 34 performs a process for adding the intersection between the segment s(i) and the other segment to the list of intersections.

In step ST709 the intersection processing unit 34 increments i so as to instruct segment s(i+1).

In step ST710 the intersection processing unit 34 determines whether or not the segment s(i+1) instructed in step ST709 is larger than the number of the segments constituting the border curves A0 and A1. If an affirmative determination is made, the process for calculating the intersection is completed. If the negative determination is made, the operation is returned to step S702. That is, the intersection processing unit 34 subjects all of the segments constituting the border curves A0 and A1 to the processes in steps ST702 to ST710. Thus, the intersection processing unit 34 performs a process for calculating the intersections among all of the segments instructed in step ST709 and the other segment which is not instructed in step ST709 so as to add the intersections to the list of intersections.

Figure 30:
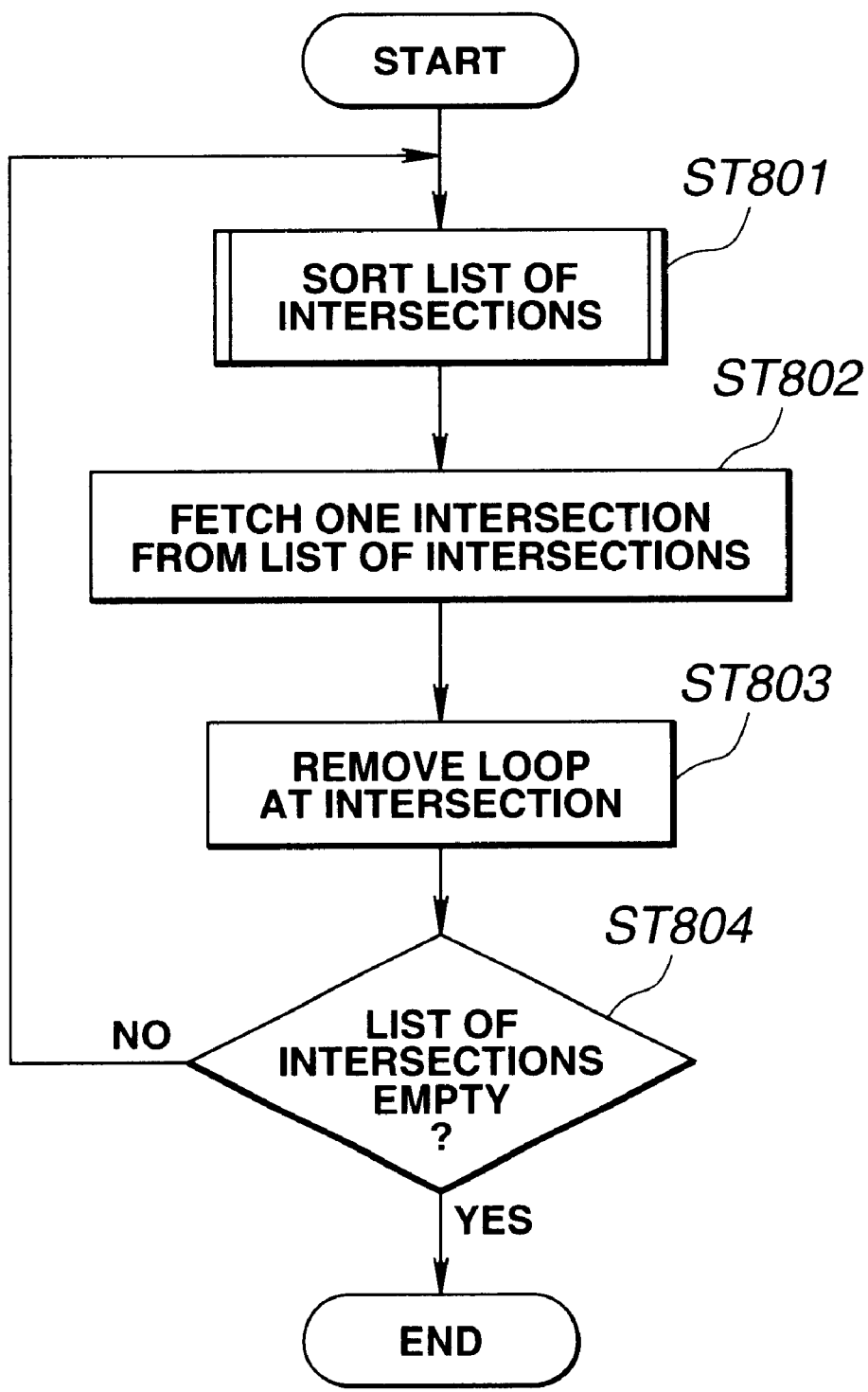
FIG. 30 is a flow chart sowing a process for removing a loop formed by a plurality of segments by using a list of intersections.

A process using the list of intersections obtained in step ST601 to remove a loop constituted by a plurality of segments will now be described with reference to a flow chart shown in FIG. 30. In step ST801 the plural-segment-loop removing portion 35 performs a process for sorting the list of intersection produced by the intersection processing unit 34. That is, the plural-segment-loop removing portion 35 sorts the list of intersections to determine the order of priorities when a loop is removed. That is, in step ST801, the plural-segment-loop removing portion 35 uses the intersection shown in the list of intersections to detect a loop. Then, the plural-segment-loop removing portion 35 performs a process for instructing an intersection so as to remove a loop having a shortest length. Note that a process of sorting the list of intersections which is performed by the plural-segment-loop removing portion 35 will be described later.

In step ST802 the plural-segment-loop removing portion 35 instructs and fetches one intersection in the list of intersections sorted in step ST801.

Figures 31B, 31C:
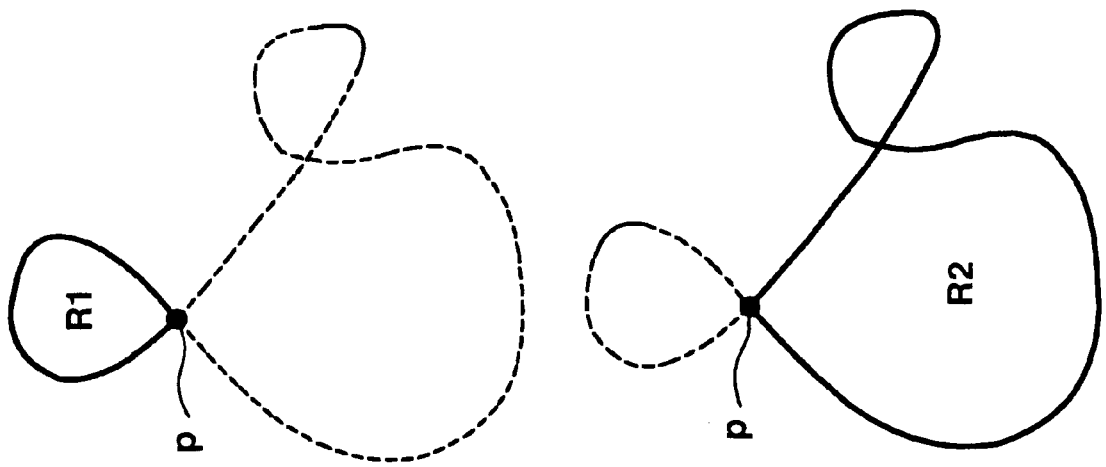
FIGS. 31B and 31C are diagrams showing loops R1 and R2 defined by intersection p.
Figure 31A:
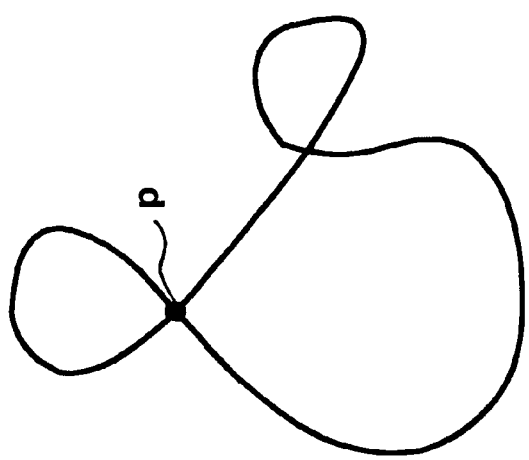
FIG. 31A is a diagram showing an example of a boundary curve.
Figure 32B:
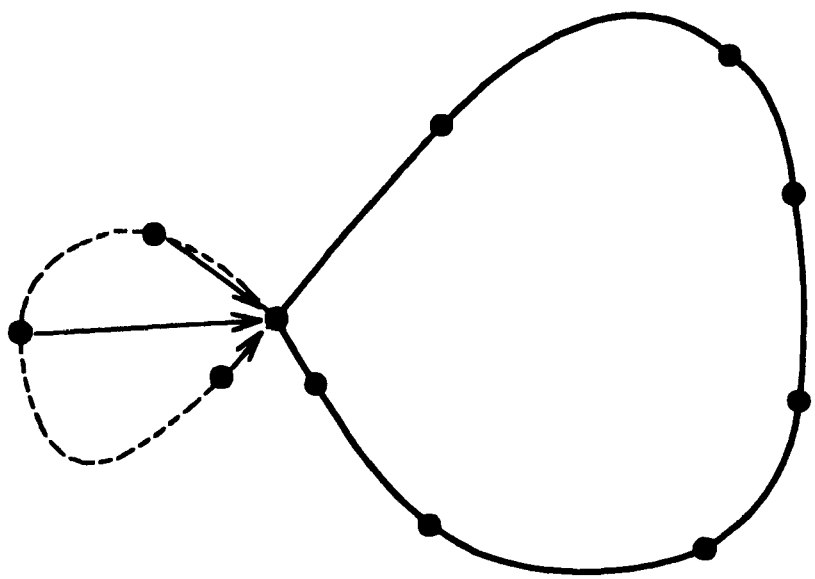
FIG. 32 is a diagram showing a process which is performed by a plural-segment-loop removing portion to unify terminal points and control points forming each segment of the loop R1 to the intersection p to remove the loop.
Figure 32A:
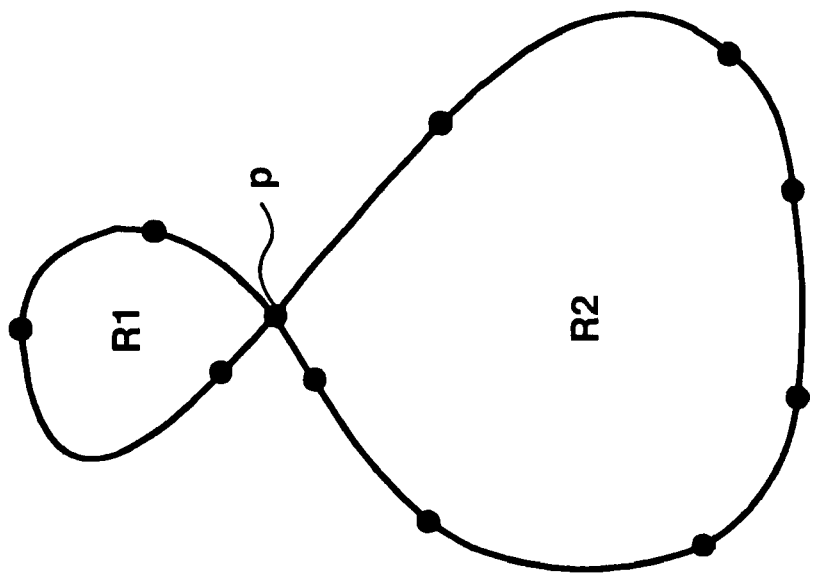

In step ST803 the plural-segment-loop removing portion 35 performs a process for removing the loop having a shorter length from the intersections instructed in step ST802. The plural-segment-loop removing portion 35 performs a process for removing loop R1 from two loops, loop R1 shown in FIG. 31B and loop R2 shown in FIG. 31C, when intersection p of the border curves A0 and A1 shown in FIG. 31A has been instructed. At this time, the plural-segment-loop removing portion 35 unifies the terminal points and control points constituting each segment of the loop R1 to the intersection p, as shown in FIG. 32. Thus, the plural-segment-loop removing portion 35 changes the border curves A0 and A1 shown in FIG. 32A to border curves A0 and A1 shown in FIG. 32B so as to remove the loop R1. At this time, the plural-segment-loop removing portion 35 performs a process for removing the loop R1 and omitting the intersection p from the list of intersections.

In step ST804 the plural-segment-loop removing portion 35 retrieves the list of intersections to determine whether or not another intersection exists in the border curves A0 and A1. When the plural-segment-loop removing portion 35 has determined that an intersection exists in the border curves A0 and A1, the plural-segment-loop removing portion 35 performs the processes in steps ST801 to ST804 to remove the loop. When the plural-segment-loop removing portion 35 has determined that no intersection exists in the border curves A0 and A1, the process for removing a loop is completed.

Figure 33:
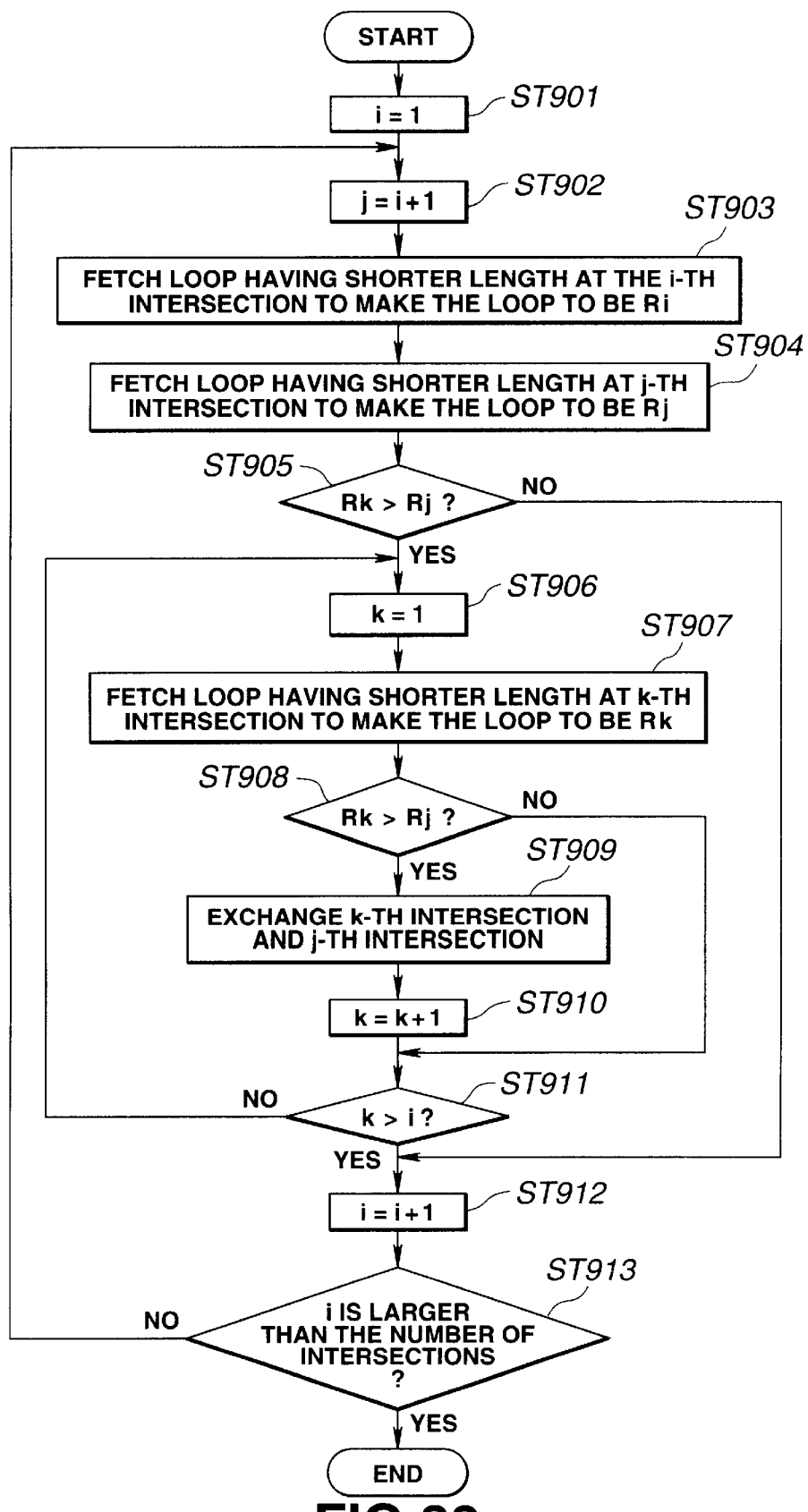
FIG. 33 is a diagram showing a process for sorting the list of intersections.

The process in step ST801 for sorting the list of intersections will now be described with reference to a flow chart shown in FIG. 33.

In step ST901 the plural-segment-loop removing portion 35 performs a process for instructing first intersection i=1 in the list of intersections. In step ST902 the plural-segment-loop removing portion 35 instructs intersection j=i+1.

In step ST903 the plural-segment-loop removing portion 35 extracts a loop having a shorter length from two loops at the i-th intersection instructed in step ST901. The extracted loop is made to be loop Ri.

In step ST904 the plural-segment-loop removing portion 35 extracts a loop having a shorter length from the two loops at the j-th intersection instructed in step ST902. The extracted loop is made to be loop Rj.

In step ST905 the plural-segment-loop removing portion 35 makes a comparison between the length of the loop Ri and that of the loop Rj. If the length of the loop Ri is longer than that of the loop Rj, the operation proceeds to step ST906. If the length of the loop Ri is not longer than that of the loop Rj, the operation proceeds to step ST912.

In step ST906 the plural-segment-loop removing portion 35 instructs k-th intersection in the list of intersections. In step ST906 the plural-segment-loop removing portion 35 performs a process for instructing k=1.

In step ST907 the plural-segment-loop removing portion 35 extracts a loop having a shorter length from the two loops at the k-th intersection instructed in step ST906. The extracted loop is made to be loop Rk.

In step ST908 the plural-segment-loop removing portion 35 makes the length of the loop Rk and that of the loop Rj. If the length of the loop Rk is longer than that of the loop Rj, the operation proceeds to step ST909. If the length of the loop Rk is not longer than that of the loop Rj, the operation proceeds to step ST911.

In step ST909 the plural-segment-loop removing portion 35 exchanges the k-th intersection and the j-th intersection. That is, the plural-segment-loop removing portion 35 makes the loop Rk at the k-th intersection to be a shortest loop.

In step ST910 the plural-segment-loop removing portion 35 performs a process for instructing k+1 th intersection.

In step ST911 the plural-segment-loop removing portion 35 determines whether or not the intersection k instructed in step ST910 is larger than the intersection i. If the plural-segment-loop removing portion 35 determines that the intersection k is smaller than intersection i, the operation proceeds to step ST912. If the plural-segment-loop removing portion 35 determines the intersection k is the same or larger than the intersection i, the operation is returned to step ST907. That is, the plural-segment-loop removing portion 35 makes a comparison of the intersections in the list of intersections between the length of loop Rk following the intersection i and that of the loop j having a length shorter than that of the loop Ri. Then, the plural-segment-loop removing portion 35 specifies the loop Rj having the shortest length.

In step ST912 the plural-segment-loop removing portion 35 instructs intersection i+1 next to the intersection i. In step ST913 the plural-segment-loop removing portion 35 determines whether or not the intersection instructed in step ST912 is larger than the number of the intersections shown in the list of intersections. If an affirmative determination is made, the process is completed. If a negative determination is made, the operation is returned to step ST902. That is, the plural-segment-loop removing portion 35 subjects all of the intersections shown in the list of intersections to the processes in steps ST902 to ST913. Thus, the plural-segment-loop removing portion 35 detects a loop having the shortest length among the loops formed in the border curves A0 and A1. Moreover, the plural-segment-loop removing portion 35 determines the order of priority when the removal of a loop is performed.

Figure 34A:
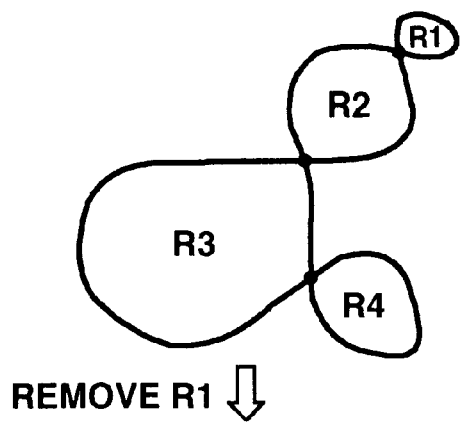
FIG. 34A is a diagram showing an example of a boundary curve in which loops R1 to R4 have been formed.
Figure 34B:
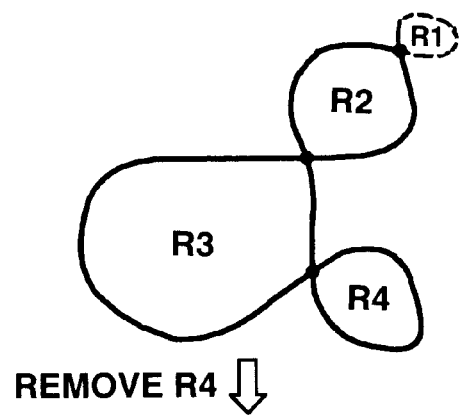
FIG. 34B is a diagram showing a process for first removing the loop R1.
Figure 34C:
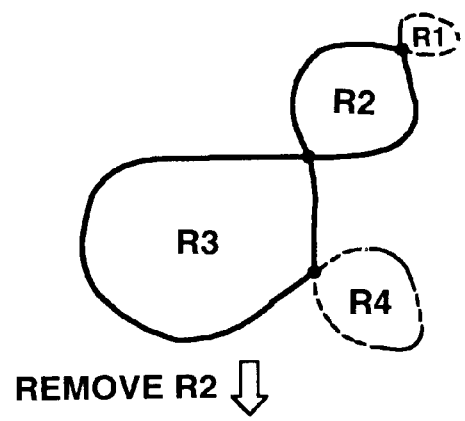
Figure 34D:
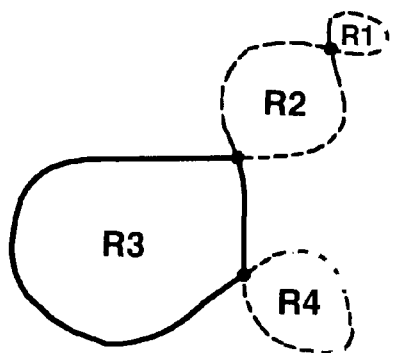

The plural-segment-loop removing portion 35 performs a process for removing loops R1 to R4 formed in the border curves A0 and A1 as shown in FIG. 34A. The plural-segment-loop removing portion 35 performs the process described with reference to FIG. 33 to determine the order of priority when the loops are removed. The plural-segment-loop removing portion 35 performs the process described with reference to FIG. 30 to first remove the loop R1, as shown in FIG. 34B, followed by removing the loop R4, as shown in FIG. 34C. Then, the plural-segment-loop removing portion 35 removes the loop R2, as shown in FIG. 34D. Thus, the loops formed in the border curves A0 and A1 can be removed.

As described above, the curve edition apparatus 1 has the segment unit-loop removing portion 32 which removes the loop formed in a single segment and the plural-segment-loop removing portion 35 which removes the loop constituted by plural segments. Therefore, the border curves A0 and A1 are edited so that a loop formed owing to deformation of the shapes of the border curves A0 and A1 is removed by the curve deforming portion 12.

The curve edition apparatus 1 removes the loop formed by a single segment by performing the rough determination as shown in FIG. 17 to determine the possibility of formation of a loop. Then, the precise determination is performed after the rough determination has been performed. Therefore, an amount of a process for removing a loop from a segment in which no loop has been formed can be reduced.

In the description about the curve edition apparatus 1, the user operates the input device 6 to produce a value of the width and the offset value so as to change the shapes of the border curves A0 and A1. However, information about the coordinates of dot sequences corresponding to the border curves A0 and A1 before the deformation is stored as reference data. Moreover, values of the widths and offset values may be produced as relative values for the overall portions of the border curves A0 and A1 with respect to reference data. Thus, the curve edition apparatus 1 is able to reduce the amount of operations which must be performed by the user who operates the input device 6 when the border curves A0 and A1 are deformed.

The curve edition apparatus 1 may be structured such that some characteristic points are set on the border curves A0 and A1 to set values of widths and offset values at the characteristic points so as to change the shapes of the border curves A0 and A1. At this time, the curve edition apparatus 1 is able to deform the overall shapes of the border curves A0 and A1 by interpolating the values of widths and the offset values set among the characteristic points. When values of widths and offset values are given to a portion of the characteristic points, the shape of only a portion of the border curves A0 and A1 can be changed.

As described above, the curve edition apparatus and the method therefor according to the present invention are structured such that the edition process is performed by converting two curves indicating the border of an object into dot sequences to change the coordinates of the dot sequences. The edition process is performed such that the dot sequences about the curves are used to change the coordinates of each point to restructure the two curves from the changed coordinates of each point. Therefore, the two boundary curves indicating the border of an object in the image can easily be edited. That is, the curve edition apparatus and the method therefor structured to follow a command issued from a user to move the widths and positions of two curves is able to automatically edit the shapes of the curves by performing the foregoing process.

The curve edition apparatus and the method therefor according to another aspect of the present invention are structured to, for each segment, detect a loop formed owing to the edition process to detect a loop formed by a plurality of segments so as to remove the detected loop. Therefore, the loop formed owing to the edition process of the boundary curves can be removed by detecting a fact that the loop is formed in segment units or mutual segments.

The curve-loop detecting method and an apparatus therefor are structured to constitute boundary curves indicating the border of an object included in an image. Then, vectors connecting terminal points and control points of segments in the form of Bezier curves defined by the terminal points and control points to one another are projected on straight lines for connecting the terminal points of the segments. Thus, the directions of the vectors are detected so as to determine whether or not the loop is formed by a single segment. The segment determined that the loop is formed by the single segment is divided. The terminal point and the control point of each segment formed owing to the division are connected to each other to set a rectangular region. Then, a determination is made whether or not the rectangular regions are superimposed to determine whether or not the loop is formed by the single segment. Therefore, the amount of a loop removing process for a segment in which no loop is formed can be reduced.

The curve-loop detecting method and an apparatus therefor use information about the intersections indicating a fact that a loop is formed owing to intersection of segments obtained by boundary curves indicating the shape of the border of an object included in an image. Thus, a plurality of loops which are made contact with one another at each intersection are extracted according to the length of each loop. Then, the plural loops made contact with one another at each intersection are removed according to the lengths of the loops. Therefore, information about the intersections is used to remove the plural loops made contact with one another at the intersections in the ascending or descending order of the length of the loop.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A curve editing apparatus comprising:
   edit means for editing the shape of a boundary curve indicating the shape of a border of an object included in an image and formed by a plurality of segments;
   first detecting means for detecting, for each segment, a loop formed as a result of an edit process performed by said edit means, the first detecting means comprising a rough determining means for determining whether or not a loop is formed by a single segment by forming a boundary curve indicating the border of an object included in an image and by projecting a vector connecting a terminal point and a control point of each segment, in the form of a Bezier curve defined by the terminal point and the control point, to each other on a straight line so as to detect the direction of the vector, and a precise determining means for determining whether or not a loop is formed by a single segment by dividing the segment which forms the loop, as determined by said rough determining means, and by setting a rectangular region surrounding each segment by connecting to each other the terminal point and the control point of each segment produced as a result of the division process to each other so as to determine whether or not the rectangular regions are superimposed;
   second detecting means for detecting a loop formed by a plurality of segments; and
   loop removing means for removing the loops detected by said first detecting means and said second detecting means.

2. A curve edition apparatus according to claim 1, wherein said precise determining means calculates the curvature of each segment produced owing to the division process to determine whether or not approximation to a straight line is permitted, and if a determination is made that the approximation to a straight line is permitted, approximation of each segment produced owing to the dividing process to a straight line is performed to calculate an intersection.

3. A curve edition apparatus, comprising:
   edit means for editing the shape of a boundary curve indicating the shape of a border of an object included in an image and formed by a plurality of segments;
   first detecting means for detecting, for each segment, a loop formed as a result of an edition process performed by said edit means;
   second detecting means for detecting a loop formed by a plurality of segments;
   loop extracting means which uses information about the intersection indicating that a loop is formed from segments formed by dividing a boundary curve indicating the shape of a border of an object included in an image intersects to extract a plurality of loops in contact with each other at each intersection according to the length of the loops; and
   loop removing means for removing the loops detected by said first detecting means and said second detecting means, wherein said loop removing means removes the loops extracted by said loop extracting means.

4. A curve edition apparatus according to claim 3, wherein said loop extracting means extracts a loop having a shortest length among said plurality of loops made contact with one another at each intersection indicated with information about the intersections, and
   said loop removing means removes the loop extracted by said loop extracting means to remove loops formed in the boundary curves in an ascending order of the length of the loop.

5. A curve editing method comprising the steps of:
   editing the shape of a boundary curve indicating the shape of the border of an object included in an image and formed by a plurality of segments;
   detecting, for each segment, a loop formed as a result of the edit by roughly determining whether or not a loop is formed by a single segment by forming a boundary curve indicating the border of an object included in an image and by projecting a vector connecting a terminal point and a control point of each segment, in the form of a Bezier curve defined by the terminal point and the control point, to each other on a straight line so as to detect the direction of the vector, followed by precisely determining whether or not a loop is formed by a single segment by dividing the segment which forms the loop, as roughly determined, and by setting a rectangular region surrounding each segment by connecting to each other the terminal point and the control point of each segment produced as a result of the division process so as to determine whether or not the rectangular region are superimposed;

detecting a loop formed by a plurality of segments: and removing the loops detected in either said detecting step.

6. A curve edition method, comprising the steps of:

editing the shape of a boundary curve indicating the shape of the border of an object included in an image and formed by a plurality of segments;

detecting, for each segment, a loop formed as a result of said editing step by roughly determining whether or not a loop is formed by a single segment by forming a boundary curve indicating the border of an object included in an image and by projecting a vector connecting a terminal point and a control point of each segment, in the form of a Bezier curve defined by the terminal point and the control point, to each other on a straight line so as to detect the direction of the vector, followed by precisely determining whether or not a loop is formed by a single segment by dividing a segment which forms the loop, as roughly determined, and by setting a rectangular region surrounding each segment by connecting to each other a terminal point and a control point of each segment produced as a result of the division process so as to determine whether or not the rectangular regions are superimposed;

detecting a loop formed by a plurality of segments; and removing the loops detected in either said detecting step, wherein said precise determining step is adapted to calculate the curvature of each segment produced as a result of a division process to determine whether or not approximation to a straight line is permitted, and if a determination is made that the approximation to a straight line is permitted, approximation of each segment produced as a result of the dividing process to a straight line is performed to calculate an intersection.

7. A curve edition method, comprising the steps of:

editing the shape of a boundary curve indicating the shape of the border of an object included in an image and formed by a plurality of segments;

detecting a loop formed as a result of the editing step for each segment;

detecting a loop formed by a plurality of segments; and removing the loops detected in either of said detecting steps, wherein said loop removing step is performed by using information about the intersection indicating that a loop is formed from segments formed by dividing a boundary curve indicating the shape of a border of an object included in an image intersects to extract a plurality of loops in contact with each other at each intersection according to the length of the loops so that said plurality of loops made contact with one another at each intersection are removed according to the length of the loop.

8. A curve edition method according to claim 7, wherein said loop removing step is performed such that a loop having a shortest length is extracted among said plurality of loops made contact with one another at each intersection indicated with information about the intersections, and loops formed in the boundary curves are removed in an ascending order of the length of the loop.

9. A curve-loop detecting method comprising the steps of:

roughly determining whether or not a loop is formed by a single segment by forming a boundary curve indicating the border of an object included in an image and by projecting a vector connecting a terminal point and a control point of each segment in the form of a Bezier curve defined by the terminal point and the control point to each other on a straight line so as to detect the direction of the vector;

precisely determining whether or not a loop is formed by a single segment by dividing the segment which forms the loop, as determined in said rough determining step, and by setting a rectangular region surrounding each segment by connecting to each other a terminal point and a control point of each segment produced as a result of the division process, so as to determine whether or not the rectangular regions are imposed, and indicating if a loop is formed by a single segment.

10. A curve-loop detecting method according to claim 9, said precise determining step is arranged to calculate the curvature of each segment produced owing to the division process to determine whether or not approximation to a straight line is permitted, and if a determination is made that the approximation to a straight line is permitted, approximation of each segment produced owing to the dividing process to a straight line is performed to calculate an intersection.

11. A curve-loop detecting apparatus comprising:

rough determining means for determining whether or not a loop is formed by a single segment by forming a boundary curve indicating the border of an object included in an image and by projecting a vector connecting a terminal point and a control point of each segment in the form of a Bezier curve defined by the terminal point and the control point to each other on a straight line so as to detect the direction of the vector;

precise determining means for determining whether or not a loop is formed by a single segment by dividing the segment which forms the loop, as determined by said rough determining means, and by setting a rectangular region surrounding each segment by connecting to each other a terminal joint and a control point of each segment produced as a result of the division process, so as to determine whether or not the rectangular regions are superimposed;

indicating if a loop is formed by a single segment.

12. A curve-loop detecting apparatus according to claim 11, wherein said precise determining means calculates the curvature of each segment produced owing to the division process to determine whether or not approximation to a straight line is permitted, and if a determination is made that the approximation to a straight line is permitted, approximation of each segment produced owing to the dividing process to a straight line is performed to calculate an intersection.

13. A curve-loop removing method comprising the steps of:

indicating that a loop is formed as a result of an intersection of segments;

extracting the loop utilizing information about the intersection; and removing the loop extracted by the extracting step.

14. A curve-loop removing method according to claim 13, wherein a loop having a shortest length is extracted among said plurality of loops made contact with one another at each intersection indicated with information about the intersections, and loops formed in the boundary curves are removed in an ascending order of the length of the loop.

15. A curve-loop removing apparatus comprising:

an indicator for indicating that a loop is formed as a result of an intersection of segments;

loop extracting means utilizing information about the intersection to extract the loop; and loop removing means for removing the loop extracted by the extracting means.

16. A curve-loop removing apparatus according to claim 15, wherein said loop extracting means extracts a loop having a shortest length from said plurality of loops made contact with one another at each intersection indicated with information about the intersections, and said loop removing means removes the loop extracted by said loop extracting means to remove loops formed in the boundary curves in an ascending order of the length of the loop.

\* \* \* \* \*